(12) United States Patent  
Uchibori

(10) Patent No.: US 11,606,361 B2  
(45) Date of Patent: Mar. 14, 2023

(54) CLOUD SYSTEM, INFORMATION PROCESSING SYSTEM, AND USER REGISTRATION METHOD

(71) Applicant: Hiroki Uchibori, Tokyo (JP)

(72) Inventor: Hiroki Uchibori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 177 days.

(21) Appl. No.: 16/922,280

(22) Filed: Jul. 7, 2020

(65) Prior Publication Data

US 2021/0021604 A1 Jan. 21, 2021

(30) Foreign Application Priority Data

Jul. 19, 2019 (JP) .............................. JP2019-134100  
May 15, 2020 (JP) .............................. JP2020-086313

(51) Int. Cl.
*H04L 9/40* (2022.01)
*H04L 67/025* (2022.01)

(52) U.S. Cl.
CPC .......... *H04L 63/102* (2013.01); *H04L 63/062* (2013.01); *H04L 63/083* (2013.01); *H04L 63/101* (2013.01); *H04L 67/025* (2013.01)

(58) Field of Classification Search
CPC ... H04L 63/102; H04L 63/062; H04L 63/083; H04L 63/101; H04L 67/025
See application file for complete search history.

(56) References Cited

U.S. PATENT DOCUMENTS

| | | | |
|---|---|---|---|
| 9,369,489 B2* | 6/2016 | Kato | H04L 63/20 |
| 9,491,326 B2 | 11/2016 | Uchibori | |
| 9,948,810 B2 | 4/2018 | Uchibori et al. | |
| 10,003,710 B2 | 6/2018 | Uchibori | |
| 10,291,620 B2 | 5/2019 | Ohzaki et al. | |
| 10,306,080 B2 | 5/2019 | Uchibori et al. | |
| 10,587,718 B2* | 3/2020 | Uchibori | H04L 51/18 |
| 11,146,543 B2* | 10/2021 | Pinner | H04L 63/0853 |
| 2007/0283273 A1* | 12/2007 | Woods | G06F 16/95 |
| | | | 715/738 |
| 2013/0269017 A1* | 10/2013 | Patil | G06F 21/41 |
| | | | 726/8 |
| 2013/0288221 A1* | 10/2013 | Kearns | G09B 7/00 |
| | | | 434/362 |
| 2014/0122349 A1 | 5/2014 | Takatsu et al. | |
| 2014/0298483 A1* | 10/2014 | Kato | H04L 63/10 |
| | | | 726/27 |
| 2015/0029535 A1 | 1/2015 | Kondoh et al. | |
| 2015/0029536 A1 | 1/2015 | Suzuki et al. | |

(Continued)

FOREIGN PATENT DOCUMENTS

| EP | 3016047 | * | 5/2006 |
|---|---|---|---|
| EP | 3016047 | | 5/2016 |

(Continued)

OTHER PUBLICATIONS

Extended European Search Report for 20185417.1 dated Nov. 30, 2020.

*Primary Examiner* — Dhairya A Patel  
(74) *Attorney, Agent, or Firm* — IPUSA, PLLC

(57) ABSTRACT

A cloud system provides services to a user registered in a tenant and includes a processor programmed to issue a communication destination for registering the user in association with the tenant.

16 Claims, 26 Drawing Sheets

(56) References Cited

U.S. PATENT DOCUMENTS

| | | | |
|---|---|---|---|
| 2015/0036167 A1* | 2/2015 | Naitoh | G06F 3/1239 |
| | | | 358/1.14 |
| 2015/0040188 A1* | 2/2015 | Takeuchi | H04L 63/08 |
| | | | 726/3 |
| 2015/0169849 A1 | 6/2015 | Takemoto et al. | |
| 2015/0281233 A1* | 10/2015 | Asenjo | G06F 21/44 |
| | | | 726/7 |
| 2015/0370847 A1* | 12/2015 | Kondoh | G06F 17/40 |
| | | | 707/691 |
| 2016/0088326 A1* | 3/2016 | Solomon | H04N 21/254 |
| | | | 725/12 |
| 2016/0182489 A1* | 6/2016 | Lewis | H04L 63/083 |
| | | | 726/8 |
| 2016/0359849 A1 | 12/2016 | Nakajima | |
| 2017/0041504 A1 | 2/2017 | Fukuda | |
| 2017/0214685 A1 | 7/2017 | Uchida | |
| 2018/0004868 A1* | 1/2018 | Adam | G06F 9/45558 |
| 2018/0077144 A1* | 3/2018 | Gangawane | H04L 63/102 |
| 2018/0131765 A1* | 5/2018 | Puleston | H04L 67/1097 |
| 2018/0270246 A1 | 9/2018 | Fukuda et al. | |
| 2018/0278715 A1 | 9/2018 | Uchibori et al. | |
| 2019/0095594 A1 | 3/2019 | Uchibori | |
| 2019/0124109 A1* | 4/2019 | Foster | H04L 67/306 |
| 2019/0188362 A1 | 6/2019 | Uchibori | |
| 2022/0038263 A1* | 2/2022 | Zhang | H04L 9/0825 |
| 2022/0385656 A1* | 12/2022 | Gujarathi | H04L 63/0876 |

FOREIGN PATENT DOCUMENTS

| | | |
|---|---|---|
| JP | 2015-032040 | 2/2015 |
| JP | 2015-032044 | 2/2015 |
| JP | 2017-033339 | 2/2017 |
| JP | 2019-036141 | 3/2019 |

* cited by examiner

FIG.9

| | | | | | | LAST | FIRST | STATE | EXTERNAL SYSTEM EMAIL ADDRESS | EXTERNAL SYSTEM ACCOUNT NAME |
|---|---|---|---|---|---|---|---|---|---|---|
| IMPORT (FILE GENERATED FROM FORMAT) ~337 | | | | | | | | | | |
| IMPORT (FILE EXPORTED FROM ACTIVE DIRECTORY) ~338 | | | | | | | | | | |
| SEND ALL USER REGISTRATION EMAILS ~339 | | | | | | | | | | |
| SEND ALL EMAIL ADDRESS CONFIRMATION EMAILS ~340 | | | | | | RICOH | ADMINISTRATOR | VALID | admin@jp.example.com | ADMINISTRATOR |
| EDIT USER REGISTRATION EMAIL FORMAT ~341 | | | | | | | | | | |
| GENERATE USER REGISTRATION URL ~342 | | | | | | RICOH | HANAKO | VALID | hanako@jp.example.com | HANAKO |
| ☐ GENERAL USER | taro | taro.sato@hoge.com | | | | RICOH | TARO | VALID | taro@jp.example.com | TARO |
| ☐ GENERAL USER | user01XXXX | TEMPORARY REGISTRATION (user01XXXX@example.com) | | | | RICOH | XXXXX | INVALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | REGISTRATION PERIOD EXPIRED (user01XXXX@example.com) | | | | RICOH | XXXXX | INVALID | XXX@jp.example.com | ADMINISTRATOR |
| ☐ GENERAL USER | user01XXXX | MODIFICATION PERIOD EXPIRED (user01XXXX@example.com) | | | | RICOH | XXXXX | INVALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | BEING MODIFIED (user01XXXX@example.com) | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |
| ☐ GENERAL USER | user01XXXX | user01XXXX@example.com | | | | RICOH | XXXXX | VALID | XXX@jp.example.com | ADMINISTRATOR |

FIG.10

USER REGISTRATION URL GENERATION

| GENERAL USER REGISTRATION | ADMINISTRATOR REGISTRATION |

USER REGISTRATION URL

NOT GENERATED

---

VALIDITY PERIOD

◉ SPECIFY  ○ NOT SPECIFY

[   ] DAYS

USER REGISTRATION UPPER LIMIT

◉ SPECIFY  ○ NOT SPECIFY

[   ] USERS

APPLICATION USE RIGHT SETTING

◉ SPECIFY  ○ NOT SPECIFY

SELECT APPLICATIONS WHOSE USE RIGHTS ARE AUTOMATICALLY GIVEN AT USER REGISTRATION.
WHEN UPPER LIMIT IS REACHED, USE RIGHTS ARE NOT GIVEN.

APPLICATION LIST
- ☐ Sample App A
- ☐ Sample App C
- ☐ Sample App D
- ☐ Sample App F
- ☐ Sample App G ( CANCEL )    ( GENERATE )

FIG.11

USER REGISTRATION URL GENERATION — 350

| GENERAL USER REGISTRATION | ADMINISTRATOR REGISTRATION |

USER REGISTRATION URL — 359

`https://xxx.accounts.sample.com/v1/aut/userRegist?code=xxxxxxxxxx`  ( COPY )

EXPIRATION DATE: 2019/05/30 17:30:25
REMAINING NUMBER OF REGISTRABLE USERS: 90
URL GENERATOR: userXYZ (RICOH TARO)

VALIDITY PERIOD

◉ SPECIFY  ○ NOT SPECIFY

[ 30 ] DAYS

USER REGISTRATION UPPER LIMIT

◉ SPECIFY  ○ NOT SPECIFY

[ 100 ] USERS

APPLICATION USE RIGHT SETTING

◉ SPECIFY  ○ NOT SPECIFY

SELECT APPLICATIONS WHOSE USE RIGHTS ARE AUTOMATICALLY GIVEN AT USER REGISTRATION.
WHEN UPPER LIMIT IS REACHED, USE RIGHTS ARE NOT GIVEN.

APPLICATION LIST
- ☐ Sample App A
- ☐ Sample App C
- ☐ Sample App D
- ☐ Sample App F
- ☐ Sample App G ( CANCEL )  ( DELETE )  ( REGENERATE )

FIG.15

Sample

USER REGISTRATION
* INDICATES REQUIRED FIELDS

USER ID* — 401

EMAIL ADDRESS* — 402
sample@example.com

LAST NAME* — 403

FIRST NAME* — 404

LANGUAGE FOR EMAIL TRANSMISSION — 405
JAPANESE

REGISTER — 406

Sample

| LOGIN INFORMATION REGISTRATION

\* INDICATES REQUIRED FIELDS

USER ID\*
taro

EMAIL ADDRESS\*
taro.sample@example.com

LAST NAME\*
SATO

FIRST NAME\*
TARO

NEW PASSWORD ⓘ \*

NEW PASSWORD (CONFIRMATION)\*

REGISTER

CLOUD SYSTEM, INFORMATION PROCESSING SYSTEM, AND USER REGISTRATION METHOD

CROSS-REFERENCE TO RELATED APPLICATIONS

The present application claims priority under 35 U.S.C. § 119 to Japanese Patent Application No. 2019-134100, filed on Jul. 19, 2019 and Japanese Patent Application No. 2020-086313, filed on May 15, 2020. The contents of which are incorporated herein by reference in their entirety.

BACKGROUND OF THE INVENTION

1. Field of the Invention

An aspect of this disclosure relates to a cloud system, an information processing system, and a user registration method.

2. Description of the Related Art

A cloud system that provides software to users via a network is known. The user can use services provided by the cloud system from a client terminal by setting a certain environment including the client terminal such as a personal computer (PC), a web browser running on the client terminal, and an Internet connection environment.

There is a case where an organization such as a company subscribes to services provided by such a cloud system, and the members of the organization use the services as users. Organizations subscribing to services of the cloud system are managed in units called tenants. Users of services (e.g., employees of a company) belong to a tenant, and an administrator is set for the tenant for internal management of the tenant. For example, Japanese Unexamined Patent Application Publication No. 2019-036141 discloses a technology for reducing the time and effort required to assign use rights to users.

However, with the related-art technology, it is not possible to flexibly add new users to a tenant, to easily manage the users, and to easily make various settings.

SUMMARY OF THE INVENTION

According to an aspect of this disclosure, there is provided a cloud system for providing services to a user registered in a tenant. The cloud system includes a processor programmed to issue a communication destination for registering the user in association with the tenant.

BRIEF DESCRIPTION OF THE DRAWINGS

FIG. 9 is a drawing illustrating an example of a user management screen displayed by the first terminal;

FIG. 10 is a drawing illustrating an example of a user registration URL generation screen displayed by the first terminal;

FIG. 11 is a drawing illustrating an example of a user registration URL generation screen including a user registration URL;

FIG. 15 is a drawing illustrating an example of a user registration screen displayed by the second terminal;

FIG. 17 is a drawing illustrating an example of a login information registration screen displayed by the second terminal;

DESCRIPTION OF THE EMBODIMENTS

An aspect of this disclosure makes it possible to flexibly add new users to a tenant, to flexibly manage the users, and to flexibly make various settings.

An information processing system 1 and a user registration method performed by the information processing system 1 are described below as examples of embodiments of the present invention.

<Outline of Operations>

Figure 1:
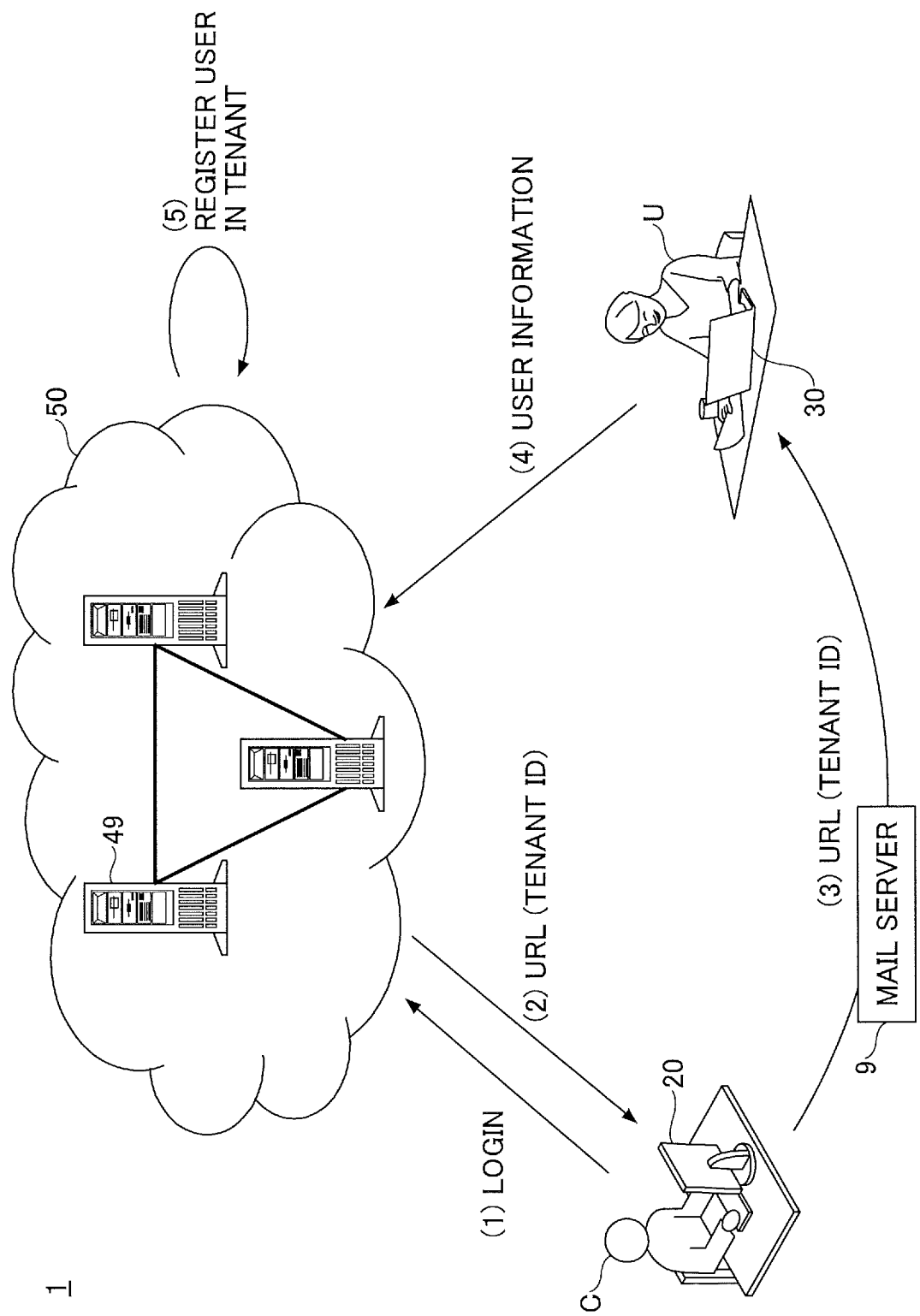
FIG. 1 is a drawing illustrating the outline of a process where a user registers information in a cloud system.

First, an outline of operations performed by the information processing system 1 is described with reference to FIG. 1. FIG. 1 is a drawing illustrating an outline of a process where a user U registers information in a cloud system 50. At least one administrator C is set for each tenant. An administrator is a person who manages the use of services within the scope of a contract made between a company and a service provider. For example, the administrator registers the user U in the tenant, manages the state of the account of the user U, registers services usable by the user U, and makes administrator settings for managing applications.

(1) An administrator C who is going to newly register a user U logs into the cloud system 50 or into a website such as a portal site provided by the cloud system 50 from the first terminal 20 as an administrator. The administrator C specifies a tenant ID in the login process, or a tenant ID associated with the administrator C is identified in the login process. As a result, a tenant managed by the administrator C is identified.

(2) The cloud system 50 sends a uniform resource locator (URL) associated with the tenant ID to the first terminal 20. Because this URL represents a communication destination with which the user U communicates to register user information, the URL is referred to as a "user registration URL".

(3) The administrator C sends the user registration URL to the user U via email. The administrator C has an employee's address book, and sends the user registration URL to email addresses of one or more users U to be registered in the tenant by referring to the address book. The user registration URL may also be sent using methods other than email. When using email, the first terminal 20 sends the email via an email server 9.

(4) The user U opens email directed to the user U with the second terminal 30 and communicates with the cloud system 50 by specifying the user registration URL. A web browser is running on the second terminal 30 and displays a user registration screen sent from cloud system 50. The user U inputs user information in the user registration screen, and the second terminal 30 sends the user information to the cloud system 50.

(5) The cloud system 50 identifies a tenant based on the tenant ID included in the URL, and registers the user information for the user U of the tenant.

Thus, the cloud system 50 generates a user registration URL for user registration for each tenant, and the user U newly performs user registration using the user registration URL. This configuration enables the cloud system 50 to register even a new user U, whose account is not present in the cloud system 50, in association with a tenant.

Terminology

A tenant indicates a group of customers who share the same software. In other words, a tenant indicates a group of users who have use rights of multiple software instances existing in the system.

A cloud system is a system that uses cloud computing. Cloud computing is a technology for providing computer resources as services via a computer network such as the Internet.

A communication destination is, for example, a network address such as an IP address that indicates a location of information. In the present embodiment, a communication destination is represented by a term "user information registration URL". A communication destination may also be referred to as a connection destination or an access destination.

A website such as a portal site provides web pages that are used by the user to use and configure various services and applications in the cloud system and used by the administrator to manage users, electronic apparatuses, and applications in the cloud system.

<Example of System Configuration>

Figure 2:
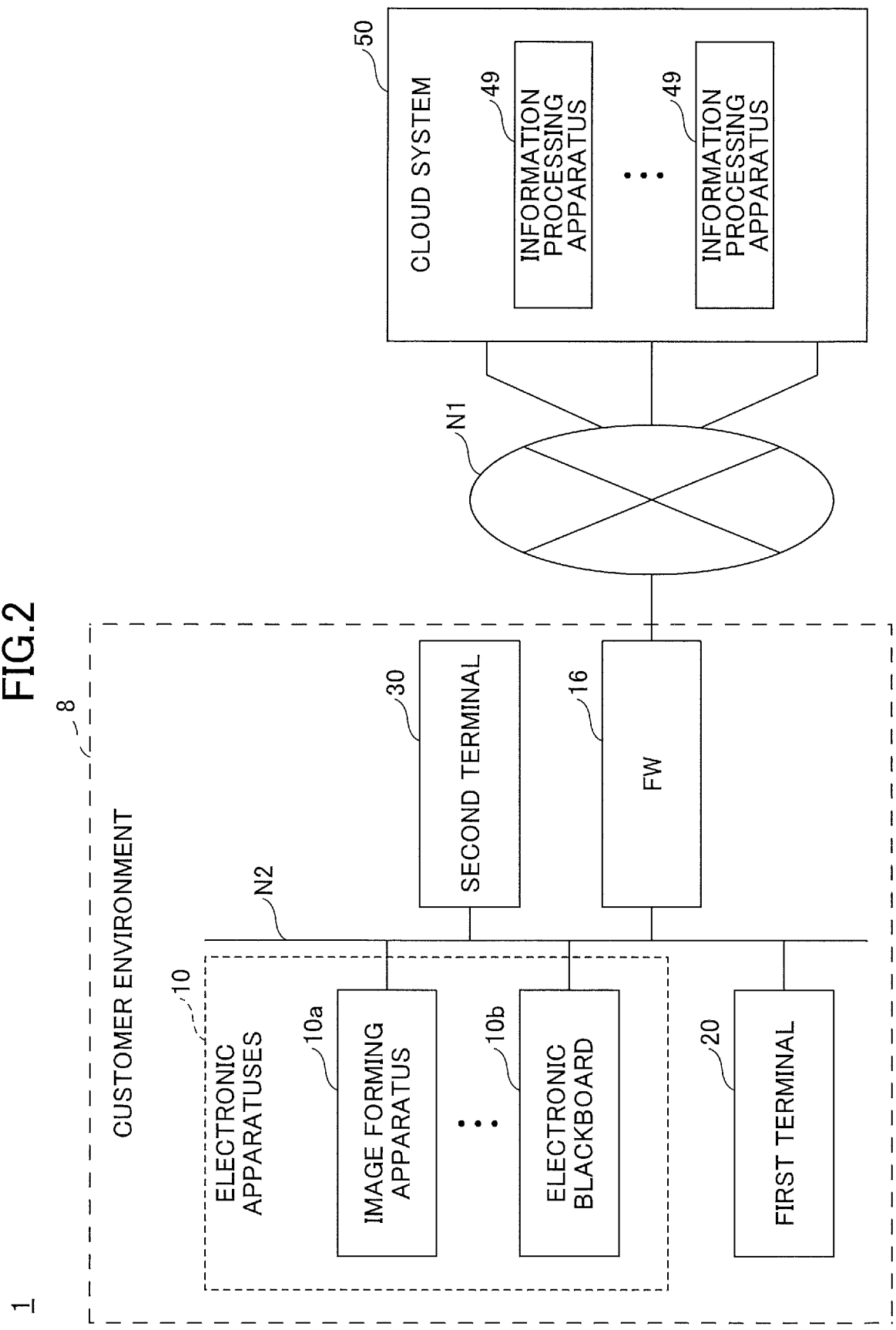
FIG. 2 is a drawing illustrating an example of a configuration of an information processing system.

FIG. 2 is a drawing illustrating an example of a configuration of the information processing system 1 according to the present embodiment. In the information processing system 1 of FIG. 2, a customer environment 8 is connected to the cloud system 50 via a network N1 such as the Internet. The network N1 may also be a telephone network such as a mobile phone network.

A customer uses services provided by the cloud system 50 and may be an organization such as a company, a group, an educational institution, an administrative institution, or a department. A user U has an employment relationship with such a customer. The customer environment 8 includes one or more electronic apparatuses 10, a first terminal 20, a second terminal 30, and a firewall (FW) 16 that are connected to each other via a network N2 such as a local area network (LAN). The cloud system 50 includes one or more information processing apparatuses 40 connected to the network N1.

An image forming apparatus 10a is an example of an electronic apparatus 10. The image forming apparatus 10a may be, for example, a laser printer, a multifunction printer, or a multifunction peripheral (product or printer). An electronic blackboard 10b is another example of an electronic apparatus 10. Other examples of electronic apparatuses 10 include output devices such as a projector (PJ) and a digital signage, a head-up display (HUD), an industrial machine, an imaging device, a sound collector, a medical device, a network home appliance, an automobile (Connected Car), a notebook PC, a mobile phone, a smartphone, a tablet terminal, a game machine, a personal digital assistant (PDA), a digital camera, a wearable PC, and a desktop PC.

The electronic apparatus 10 of the present embodiment is a terminal used by the user U registered in the cloud system 50 to use services. The user U logs into the cloud system 50 from the electronic apparatus 10, selects an application (application software) whose use right is assigned to the user U, and receives a service provided by the cloud system 50. Thus, services are provided in units of applications.

The first terminal 20 is an information processing apparatus such as a smartphone, a mobile phone, a tablet PC, a desktop PC, or a notebook PC used by the administrator C. The first terminal 20 includes a program such as a web browser including a screen display function. The program is not limited to a web browser as long as the program includes a function for displaying screen information received from the cloud system 50 on a screen. A dedicated program for the cloud system 50 may also be used.

The second terminal 30 is an information processing apparatus such as a smartphone, a mobile phone, a tablet PC, a desktop PC, or a notebook PC used by the user U. The second terminal 30 includes a program such as a web browser including a screen display function. The program is not limited to a web browser as long as the program includes a function for displaying screen information received from the cloud system 50 on a screen. A dedicated program for the cloud system 50 may also be used.

The firewall 16 is an apparatus for preventing external intrusion into the customer environment 8, and all communications from the customer environment 8 are monitored by the firewall 16. However, this does not apply to a case where the first terminal 20 and the second terminal 30 communicate with the cloud system 50 via a telephone network such as a mobile phone network.

The cloud system 50 provides various services for the electronic apparatuses 10 and the second terminal 30. Services vary depending on the types of electronic apparatuses 10. Examples of services provided for the image forming apparatus 10a include a service for uploading and storing a scanned document in a storage on the cloud and a service for downloading and printing image data in a storage on the cloud. Examples of services provided for the electronic blackboard 10b include a service for creating minutes by voice recognition in real time and a service for converting handwritten data into text. Examples of services provided for the second terminal 30 include a real-time translation service for translating web pages.

In the cloud system 50, tenants and users U are associated with each other. Usable services (applications) are determined for each user U, and the user U uses the usable applications from the electronic apparatus 10 or the second terminal 30. Tenants, the administrator C, and the users U may have the following relationships.

One customer→one tenant (the administrator C and the user U belong to one tenant)

One customer→multiple tenants (the administrator C does not necessarily belong to a tenant, and manages tenants and users U belonging to the tenants.

Each user U belongs to one or more tenants) In any case, the user U registered in the cloud system 50 belongs to at least one tenant. Accordingly, after registration, once the user U is identified, the tenant to which the user U belongs is also identified. On the other hand, because a new user U does not belong to any tenant, it is difficult for the cloud system 50 to determine a tenant in which the user U needs to be registered. In the case of one customer→one tenant, the tenant to which the administrator C belongs is automatically determined when the administrator C logs into the tenant (it is not necessary to specify the tenant). In the case of one customer→multiple tenants, the administrator C may specify a tenant at the login process (or the administrator C may have different accounts for different tenants).

The cloud system 50 generates screen information of a web page to be displayed by the first terminal 20, the second terminal 30, or the electronic apparatus 10, and sends the screen information to the first terminal 20, the second terminal 30, or the electronic apparatus 10. For example, the cloud system 50 causes the first terminal 20, the second terminal 30, or the electronic apparatus 10 to display a screen such as a user registration URL generation screen, a user registration screen, a use right management screen, or a login screen described later.

The screen information is generated using, for example, HTML, XML, cascade style sheet (CSS), and/or JavaScript (registered trademark). A web page may be provided by a web application. A web application refers to software or a mechanism that runs on a web browser and implemented by a cooperation between a program written in a programming language (for example, JavaScript (registered trademark)) running on the web browser and a program on a web server. A web page can be changed dynamically by a web application.

Cloud computing refers to a technology/system/environment where resources on a network are used without awareness of specific hardware resources.

The configuration of the information processing system 1 illustrated in FIG. 2 is an example, and one or more servers (such as a proxy server and a gateway server) may be provided between the customer environment 8 and the cloud system 50. Further, the first terminal 20 and the second terminal 30 may be provided outside of the customer environment 8 and may be connected to, for example, the network N1.

The cloud system 50 may be implemented by one information processing apparatus 49, or may be distributed to multiple information processing apparatuses 49. For example, an information processing apparatus 49 may be provided for each service, one information processing apparatus 49 may provide multiple services, or multiple information processing apparatuses 49 may provide one service.

In the information processing system 1 of FIG. 2, the cloud system 50 is connected to the network N1 such as the Internet outside of the customer environment 8. In other words, the information processing system 1 of FIG. 2 is an example where the cloud system 50 is provided in a cloud environment. Alternatively, the cloud system 50 may be provided inside of the customer environment 8 (on-premises environment).

<Example of Hardware Configuration>
<<Computer>>

Figure 3:
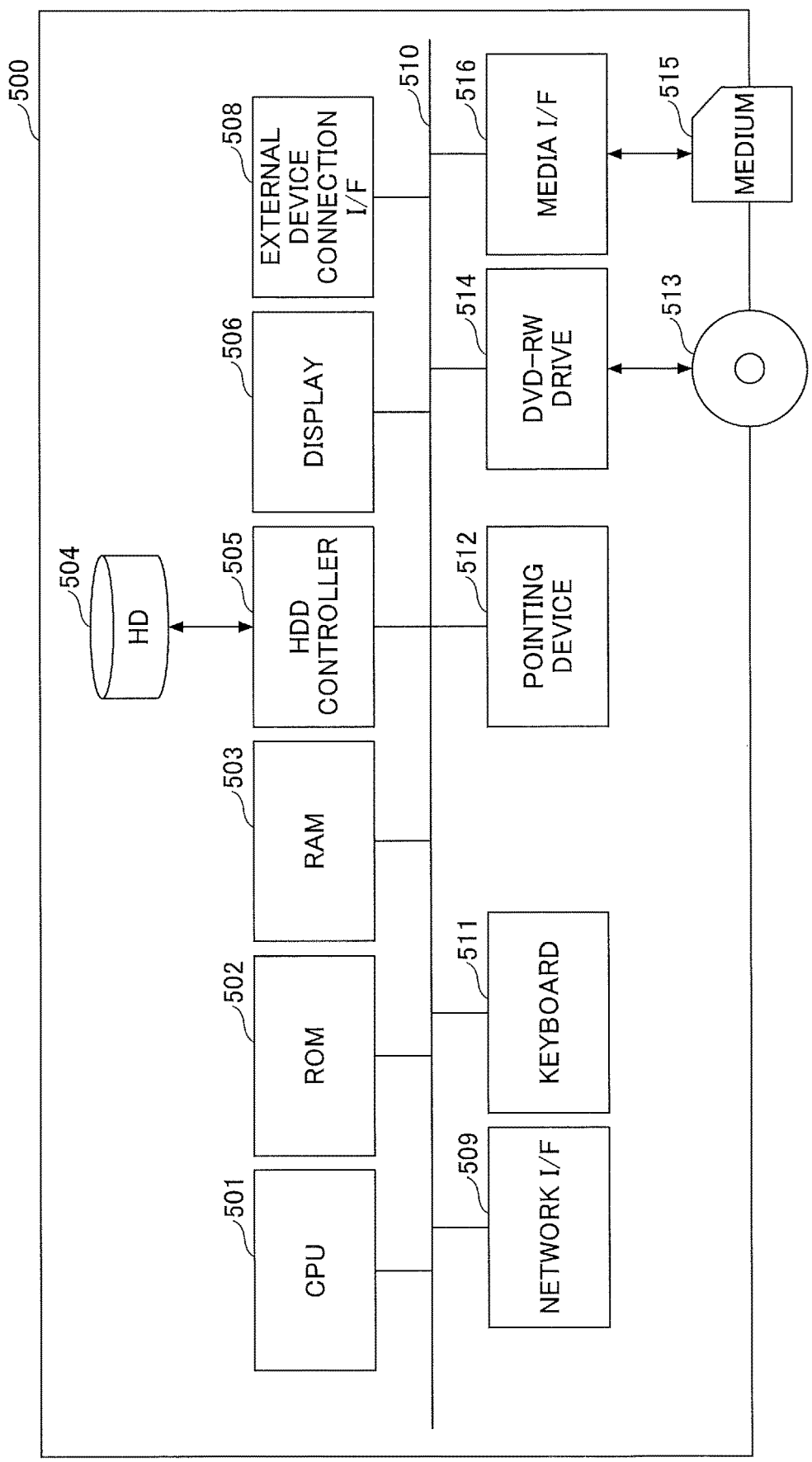
FIG. 3 is a drawing illustrating an example of a hardware configuration of a computer.

Each of the first terminal 20, the second terminal 30, and the information processing apparatus 49 of the cloud system 50 illustrated in FIG. 2 may be implemented by, for example, a computer with a hardware configuration illustrated in FIG. 3. FIG. 3 is drawing illustrating an example of a hardware configuration of a computer. As illustrated in FIG. 3, a computer 500 includes a CPU 501, a ROM 502, a RAM 503, a HD 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a media I/F 516.

The CPU 501 controls the operation of the entire computer. The ROM 502 stores a program such as an IPL for driving the CPU 501. The RAM 503 is used as a work area for the CPU 501. The HD 504 stores various types of data such as programs. The HDD controller 505 controls reading and writing of data from and to the HD 504 under the control of the CPU 501. The display 506 displays various information items such as a cursor, menus, windows, characters, and images. The external device connection I/F 508 is an interface for connecting various external devices. Examples of external devices include an universal serial bus (USB) memory and a printer. The network I/F 509 is an interface for data communications via the network N1/N2. The bus line 510 is, for example, an address bus or a data bus for electrically connecting the components of the computer 500 illustrated in FIG. 3.

The keyboard 511 is an example of an input unit including multiple keys for inputting characters, numerical values, and various instructions. The pointing device 512 is an example of an input unit for selecting and executing various instructions, selecting an object, and moving a cursor. The DVD-RW drive 514 controls reading and writing of various types of data from and to a DVD-RW 513, which is an example of a removable recording medium. The DVD-RW drive 514 may support not only a DVD-RW but also other recording media such as a DVD-R. The media I/F 516 controls reading and writing (storing) of data from and to a recording medium 515 such as a flash memory.

<<Image Forming Apparatus>>

Figure 4:
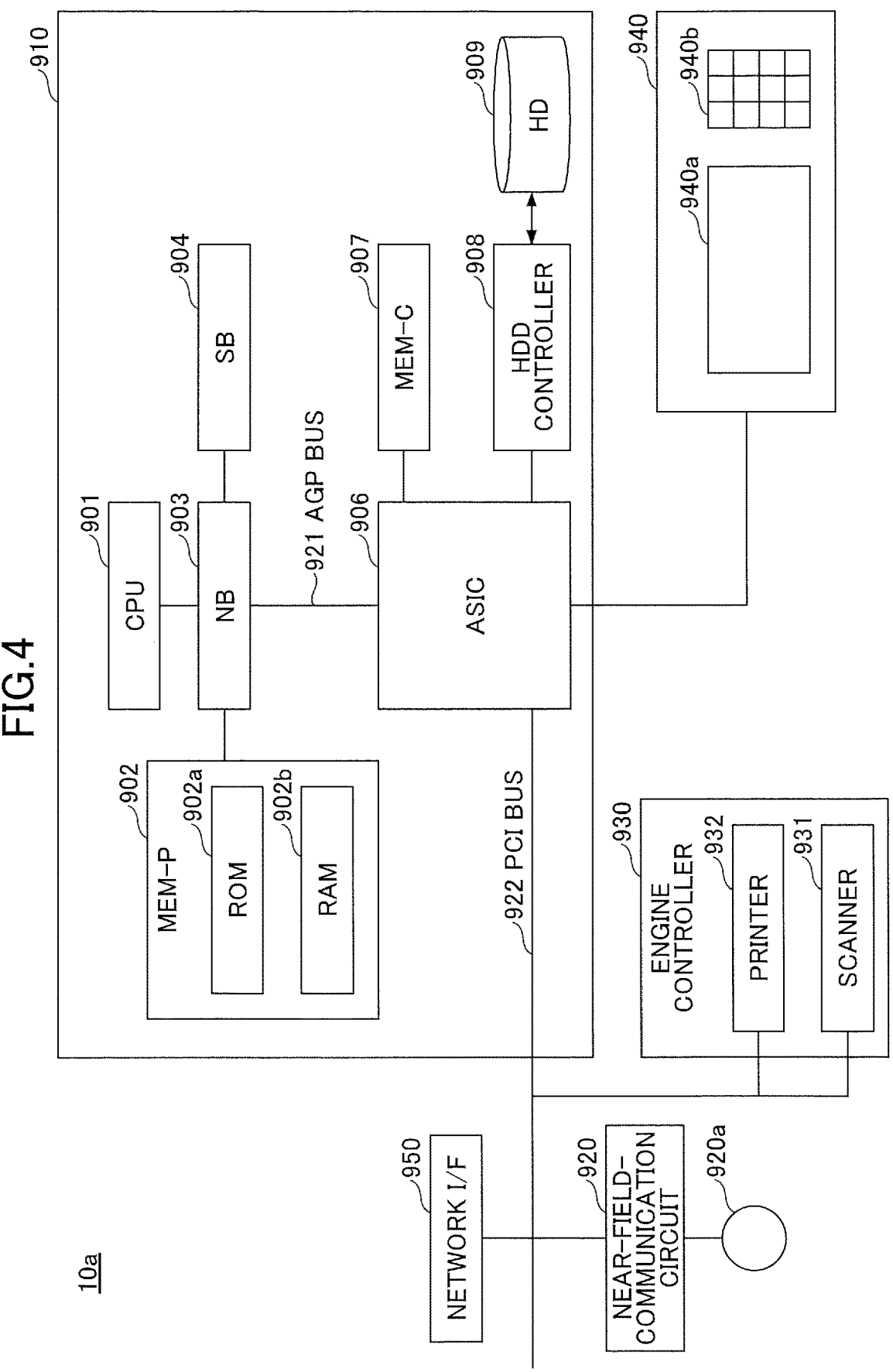
FIG. 4 is a drawing illustrating an example of a hardware configuration of an image forming apparatus.

FIG. 4 is a drawing illustrating an example of a hardware configuration of the image forming apparatus 10a. As illustrated in FIG. 4, the image forming apparatus 10a includes a controller 910, a near-field-communication circuit 920, an engine controller 930, an operations panel 940, and a network I/F 950.

The controller 910 includes a CPU 901 that is a main component of a computer, a system memory (MEM-P) 902, a north bridge (NB) 903, a south bridge (SB) 904, an application specific integrated circuit (ASIC) 906, a local memory (MEM-C) 907 that is a storage, an HDD controller 908, an HD 909 that is a storage, and an accelerated graphics port (AGP) bus 921 connecting the NB 903 to the ASIC 906.

The CPU 901 is a controller that controls the entire image forming apparatus 10a. The NB 903 is a bridge for connecting the CPU 901, the MEM-P 902, the SB 904, and the AGP bus 921 to each other, and includes a memory controller for controlling reading and writing of data from and to the MEM-P902, a peripheral component interconnect (PCI) master, and an AGP target.

The MEM-P 902 includes a ROM 902a that is a memory for storing programs and data for implementing functions of the controller 910, and a RAM 902b that is used, for example, to load programs and data and as a drawing memory for memory printing. The programs stored in the RAM 902b may be provided as installable or executable files recorded in a computer-readable recording medium such as a CD-ROM, a CD-R, or a DVD.

The SB 904 is a bridge for connecting the NB 903 to PCI devices and peripheral devices. The ASIC 906 is an integrated circuit (IC) for image processing and includes hardware components for image processing. The ASIC 906 functions as a bridge that connects the AGP bus 921, the PCI bus 922, the HDD controller 908, and the MEM-C 907 to each other. The ASIC 906 includes a PCI target, an AGP master, an arbiter (ARB) that is the core of the ASIC 906, a memory controller that controls the MEM-C 907, multiple direct memory access controllers (DMAC) that, for example, rotate image data using hardware logic, and a PCI unit that performs data transfer between a scanner 931 and a printer 932 via the PCI bus 922. A universal serial bus (USB) interface and/or an IEEE1394 (Institute of Electrical and Electronics Engineers 1394) interface may be connected to the ASIC 906.

The MEM-C 907 is a local memory used as an image buffer for copying and a code buffer. The HD 909 is a storage for storing image data, font data used for printing, and forms. The HDD controller 908 controls reading and writing of data from and to the HD 909 under the control of the CPU 901. The AGP bus 921 is a bus interface for a graphics accelerator card proposed to speed up graphics processing. The AGP bus 921 enables direct access to the MEM-P 902 at high throughput, and can increase the speed of the graphics accelerator card.

The near-field-communication circuit 920 is provided with a near-field-communication circuit antenna 920a. The near-field-communication circuit 920 is, for example, a communication circuit for NFC or Bluetooth (registered trademark).

Further, the engine controller 930 includes the scanner 931 and the printer 932. The operations panel 940 includes a panel display 940a such as a touch panel that displays, for example, current settings and a selection screen and receives inputs from an operator, and hardware keys 940b including a numeric keypad for receiving settings of conditions related to image forming such as density settings and a start key for receiving a copy start instruction. The controller 910 controls the entire image forming apparatus 10a, and controls, for example, drawing, communications, and inputs from the operations panel 940. Each of the scanner 931 and the printer 932 includes an image processor for error diffusion and gamma conversion.

An application switching key of the operations panel 940 enables sequentially switching and selecting a document box function, a copy function, a printer function, and a facsimile function of the image forming apparatus 10a. The image forming apparatus 10a transitions to a document box mode when the document box function is selected, to a copy mode when the copy function is selected, to a printer mode when the printer function is selected, and to a facsimile mode when the facsimile function is selected.

The network I/F 950 is an interface for data communications via the network N1/N2. The near-field-communication circuit 920 and the network I/F 950 are electrically connected to the ASIC 906 via the PCI bus 922.

<Functions>

Figure 5:
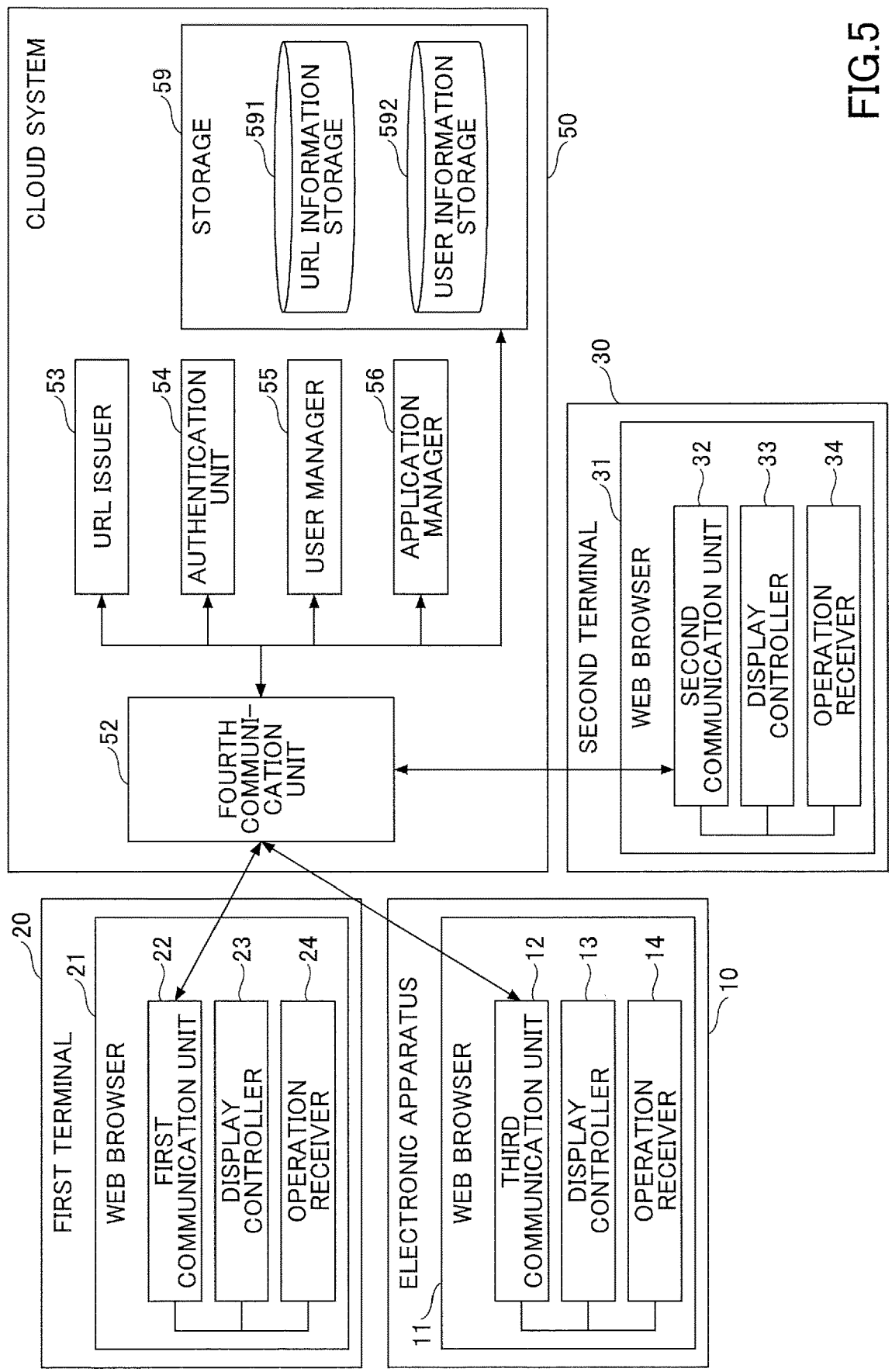
FIG. 5 is a block diagram illustrating examples of functional configurations of a first terminal, a second terminal, an electronic apparatus, and a cloud system.

The functions of apparatuses included in the information processing system 1 of the present embodiment are implemented by, for example, processing blocks as illustrated in FIG. 5. FIG. 5 is a block diagram illustrating functional configurations of the first terminal 20, the second terminal 30, the electronic apparatus 10, and the cloud system 50.

<<First Terminal>>

The first terminal 20 includes a first communication unit 22, a display controller 23, and an operation receiver 24. The first terminal 20 implements functional blocks as illustrated in FIG. 5 by executing a program (e.g., a web browser 21).

The first communication unit 22 communicates with the cloud system 50 and receives screen information used by the first terminal 20 to display a user registration URL generation screen. Also, the first communication unit 22 sends information entered by the administrator C on the user registration URL generation screen to the cloud system 50.

The display controller 23 analyzes the screen information received from the cloud system 50 and displays, for example, a user registration URL generation screen on the display 506. The operation receiver 24 receives an operation (for example, an input of information on the user registration URL generation screen) performed by the administrator C on the first terminal 20.

<<Second Terminal>>

The second terminal 30 includes a second communication unit 32, a display controller 33, and an operation receiver 34. The second terminal 30 implements functional blocks as illustrated in FIG. 5 by executing a program (e.g., a web browser 31).

The second communication unit 32 communicates with the cloud system 50 and receives screen information used by the second terminal 30 to display a user registration screen. The second communication unit 32 also sends information entered by the user U on the user registration screen to the cloud system 50.

The display controller 33 analyzes the screen information received from the cloud system 50 and displays, for example, a user registration screen on the display 506. The operation receiver 34 receives an operation (for example, an input of information on the user registration screen) performed by the user U on the second terminal 30.

<<Electronic Apparatus>>

The electronic apparatus 10 includes a third communication unit 12, a display controller 13, and an operation receiver 14. The electronic apparatus 10 implements functional blocks as illustrated in FIG. 5 by executing a program (for example, a web browser 11).

The third communication unit 12 communicates with the cloud system 50 to receive screen information used by the electronic apparatus 10 to display, for example, a standby screen, a launcher screen, a login screen, and an application screen. The third communication unit 12 also sends information input by the user U on the standby screen, the launcher screen, the login screen, and the application screen to the cloud system 50.

The display controller 13 analyzes the screen information received from the cloud system 50 and displays, for example, a standby screen, a launcher screen, a login screen, and an application screen on the operations panel 940. The operation receiver 14 receives an operation (for example, starting a launcher, inputting authentication information, selecting an application, and an operation on an application) performed by the user U on the electronic apparatus 10.

<<Cloud System>>

The cloud system 50 includes a fourth communication unit 52, a URL issuer 53, an authentication unit 54, a user manager 55, and an application manager 56. These functional components of the cloud system 50 are implemented by executing a program loaded from the HD 504 to the RAM 503 by the CPU 501 of the computer 500 illustrated in FIG. 3.

The fourth communication unit 52 sends and receives various types of information to and from the first terminal 20, the second terminal 30, and the electronic apparatus 10. For example, the fourth communication unit 52 sends screen information of the user registration URL generation screen to the first terminal 20, sends screen information of the user registration screen to the second terminal 30, and sends screen information of the standby screen, the launcher screen, the login screen, and the application screen to the electronic apparatus 10. Also, the fourth communication unit 52 receives information entered on these screens.

The URL issuer 53 generates screen information for the user registration URL generation screen, generates a user registration URL including a tenant ID of a tenant to which the administrator C belongs and a code identifying a user registration URL in response to a request from the administrator C, and sends the screen information and the user registration URL to the first terminal 20 via the fourth communication unit 52. The code is identification information for identifying the user registration URL. Also, the URL issuer 53 determines whether a user registration URL is valid when the second terminal 30 performs a communication by specifying the user registration URL.

The authentication unit 54 authenticates the administrator C and the user U and determines whether the authentication is successful. Here, authentication indicates determining whether the user U or the administrator C is an authorized user. In the present embodiment, the authentication unit 54 determines whether the user U or the administrator C has a right to use the cloud system 50, and can also determine whether a person accessing the cloud system 50 is the user U or the administrator C. Successful authentication indicates permitting the user U or the administrator C to log into the cloud system 50. Login is an authentication process performed to access system resource to use various services on a computer or the Internet by using pre-registered account information. The account information is, for example, a user ID and a password, an IC card number, or biometric authentication information. The account information is, for example, a user ID and a password, an IC card number, or biometric authentication information.

The user manager 55 manages user information. For example, the user manager 55 registers user information in a user information storage 592 described later, and obtains (reads) user information from the user information storage 592.

The application manager 56 manages default settings of applications for each user and applies the default settings to the applications.

The cloud system 50 also includes a storage 59 implemented by, for example, the HD 504 and/or the RAM 503 illustrated in FIG. 3. The storage 59 includes a URL information storage 591 and a user information storage 592. The URL information storage 591 is described using Table 1 below.

TABLE 1

| TENANT ID = 001 | |
|---|---|
| ITEMS | DESCRIPTIONS |
| USER REGISTRATION URL | Including information indicating a tenant for which the user registration URL is provided and a code for identifying the URL itself<br>e.g., https://xxxxx.sample.com/tenants/{tenant_id}/registerUser?code=XXXXXXXXXX |
| USER REGISTRATION SCREEN URL | URL of a screen opened by a terminal redirected when the user registration URL is valid |
| REDIRECTION URL FOR SUCCESSFUL REGISTRATION | URL of a screen to which a terminal is redirected when the user registration is successful |
| REDIRECTION URL FOR FAILED REGISTRATION | URL of a screen to which a terminal is redirected when the user registration fails |
| VALIDITY PERIOD | Validity period of URL, e.g., 100 days |
| EXPIRATION DATE | Expiration date of URL, e.g., 2019/10/31 |
| USER REGISTRATION UPPER LIMIT | The number of users that can be registered with the URL, e.g., 10000 users |
| REMAINING NUMBER OF REGISTRABLE USERS | The remaining number of users that can be registered with the URL, e.g., 25 users |
| USE-RIGHT-ASSIGNED APPLICATION ID LIST | List of IDs of applications whose use rights are automatically given at user registration |
| AUTHOR | User information of the author of the user registration URL |
| STATE | State of the user registration URL: valid or invalid<br>Invalid states include:<br>Expiration date has passed<br>The remaining number of registrable users is 0<br>The author has been deleted<br>The author is in an invalid state<br>The author is no longer a tenant administrator |

Table 1 illustrates an example of URL information stored in the URL information storage 591. The URL information is associated with a tenant ID, and one or more sets of URL information are generated for each tenant. When one set of URL information is provided for each tenant, old URL information is deleted (overwritten) each time the administrator C generates new URL information. Alternatively, the administrator C may generate multiple sets of URL information for one tenant and use the sets of URL information depending on users U.

The tenant ID is identification information for identifying a tenant. ID is an abbreviation of Identification and indicates an identifier or identification information. An ID refers to a name, a code, a character string, a numerical value, or a combination of one or more of these items that is used to uniquely identify a specific object among multiple objects. The same applies to IDs other than tenant IDs.

The URL information storage 591 stores, for each user U, items including a user registration URL, a user registration screen URL, a URL redirected when registration is successful, a URL redirected when registration fails, a validity period, an expiration date, a user registration upper limit, a remaining number of registrable users, a use right assigned application ID list, an author, and a state.

User registration URL: a URL that includes information indicating a tenant for which the user registration URL is provided and a code for identifying the URL itself. This URL indicates a communication destination with which the user U who have received email communicates to register user information. The communication destination may be a network address, and the communication destination may also be referred to as a connection destination or an access destination. An example of a user registration URL is given below. e.g.) https://xxxxx.sample.com/tenants/{tenant_id}/register User?code=XXXXXXXXXX In the user registration URL, "tenant_id" corresponds to a tenant ID, and "XXXXXXXXXX" in the query string is a code that identifies the URL itself. Therefore, when the user U connects to the user registration URL to register user information, the cloud system 50 can identify the tenant and the URL information. As described later, the tenant ID is automatically determined when the administrator C logs in. The user registration URL is generated for a user or an administrator, and whether user information of the user U or user information of the administrator C is registered is determined depending on the type of user registration URL.

User registration screen URL: a URL of a screen to which the second terminal 30 operated by the user U is redirected when the user registration URL is valid.

Redirection URL for successful registration: a URL of a screen to which the second terminal 30 operated by the user U is redirected when user registration is successful.

Redirection URL for failed registration: a URL of a screen to which the second terminal 30 operated by the user U is redirected when user registration fails.

Validity period: a validity period of the user registration URL. The administrator C can set any validity period (e.g., 100 days).

Expiration date: an expiration date of the user registration URL. The administrator C can set any expiration date (e.g., "20XX/10/31").

User registration upper limit: the upper limit of the number of users that can be registered in one tenant with the user registration URL. The administrator C can set the user registration upper limit at any value (e.g., 10000 users). The value of the user registration upper limit may be limited by a contract with the service provider. Here, the "user registration upper limit" indicates the maximum number of users that can belong to a tenant, and the number of users to which the use right of an application can be assigned ("registration limit" described later) is set separately for each application.

Remaining number of registrable users: the remaining number of users that can be registered with the user registration URL. The remaining number of registrable users (e.g., 25 users) is obtained by subtracting the number of registered users from the "user registration upper limit".

Use-right-assigned application ID list: a list of IDs of applications whose use right is automatically given at user registration.

Author: user information of the author of the user registration URL. For example, information such as a user name, a user ID, and an email address for identifying the administrator C are set in the "Author".

State: the state (valid or invalid) of the user registration URL. There are the following invalid states.
The expiration date has passed.
The remaining number of registrable users is zero.
The author has been deleted.
The author is in an invalid state (the state of the account of the administrator C is invalid (see Table 2)).
The author is no longer an administrator (the role of the author is not the administrator C (see Table 2)).

TABLE 2

| ITEMS | DESCRIPTIONS |
|---|---|
| TENANT ID | ID of a tenant to which the user belongs |
| USER ID | — |
| PASSWORD | — |
| LAST NAME | — |
| FIRST NAME | — |
| EMAIL ADDRESS | — |
| LANGUAGE (LOCALE) | — |
| STATE OF ACCOUNT | valid, invalid, or account locked |
| ROLE | administrator or general user |
| USABLE APPLICATION INFORMATION LIST | Information on applications usable by the user, the information at least includes application ID: ID for identifying the application license ID: ID indicating the assigned use right |

Table 2 illustrates an example of user information stored in the user information storage 592. The user information is associated with a tenant ID. That is, the number of sets of user information correspond to the number of users U belonging to the tenant. Note that users U registered in the user information storage 592 include administrators C. Each user U connects to the cloud system 50 and registers user information by using the user registration URL.

The user information includes a tenant ID, a user ID, a password, a last name, a first name, an email address, language (locale), a state of account, a role, and a usable application information list.

Tenant ID: identification information of a tenant to which the user U belongs.
User ID: identification information of the user U.
Password: secret information that proves the authenticity of the user U.
Last name: the last name of the user U.
First name: the first name of the user U.
Email address: an email address of the user U.
Language (locale): the language of characters displayed on a screen used by the user U.
State of account: an account is a right of the user U to log into the cloud system 50. The states of an account include at least "valid", "invalid", and "account locked". An account becomes invalid when user information is temporarily registered and becomes valid when user information is officially registered. Even after an account becomes valid, the administrator C can set the account to invalid. An account is locked when the user U enters incorrect passwords several times while the account is valid. The "account locked" differs from "invalid" in that the account returns to the valid state after a certain period of time and in that the user U is still counted as a user belonging to a tenant.

Role: authority of the user U. Examples of roles include "administrator C" and "general user". In the present embodiment, a general user is referred to as a user U.

Usable application information list: information on applications that the user U can use. The usable application information list includes the following information items.

Application ID: identification information for identifying an application (unique to the application).

License ID: identification information for identifying a use right of an application given to the user U (different license IDs are assigned to different users U).

The tenant ID, the state of account, the role, and the usable application information list that are not blank in Table 2 are automatically determined. The user ID, the password, the last name, the first name, the email address, and the language (locale) that are blank in Table 2 are set by the user U.

<User Registration Url Generation Process>

Figure 6:
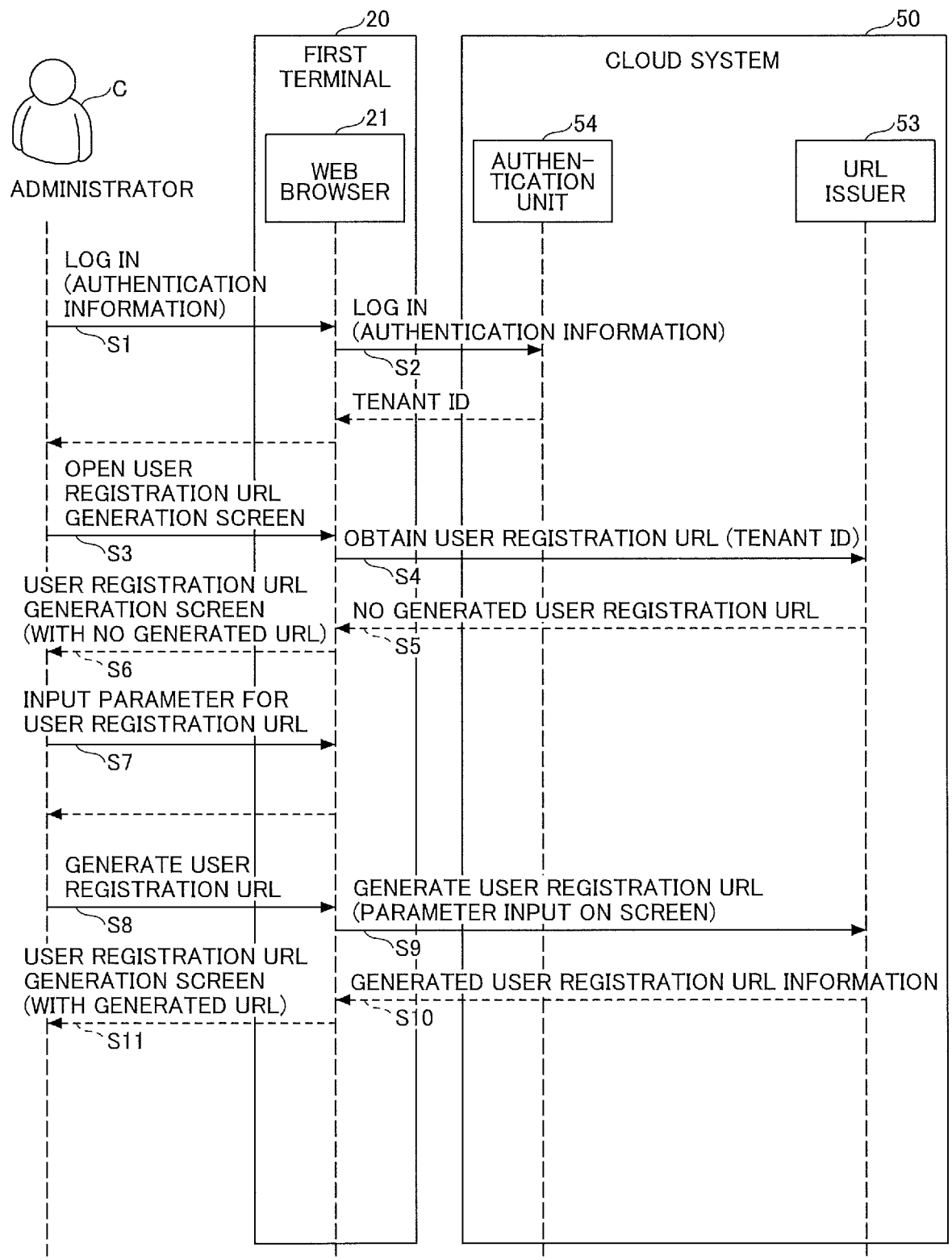
FIG. 6 is a sequence chart illustrating an example of a process where an administrator operates the first terminal to generate a user registration URL.

First, a process where the administrator C generates a user registration URL is described with reference to FIG. 6. FIG. 6 is a sequence chart illustrating a process where the administrator C operates the first terminal 20 to generate a user registration URL.

Figure 7:
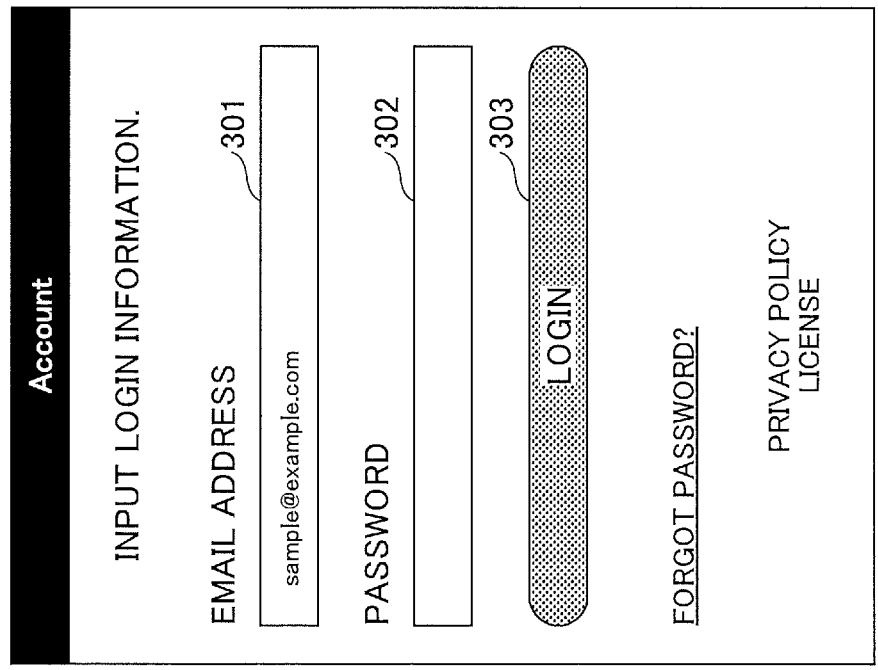
FIG. 7 is a drawing illustrating an example of a login screen displayed by the first terminal.

S1: the administrator C operates the first terminal 20 to communicate with the cloud system 50, and the first terminal 20 displays a login screen. The administrator C performs an operation on the login screen (enters authentication information) to log into the cloud system 50. There are a case where the administrator C enters "user ID and password" and a case where the administrator C enters "tenant ID, user ID (or email address), and password". In the former case, the administrator C belongs to only one tenant. In the latter case, the administrator C specifies a tenant when logging into the cloud system 50. FIG. 7 illustrates an example of a login screen. FIG. 7 corresponds to the former case. The operation receiver 24 of the first terminal 20 receives the entered authentication information.

S2: The first communication unit 22 of the first terminal 20 sends a login request to the cloud system 50 together with the authentication information. The fourth communication unit 52 of the cloud system 50 receives the login request, and the authentication unit 54 authenticates the administrator C based on user information obtained from the user manager 55. In the present embodiment, it is assumed that the authentication has been successful. As a result, the tenant ID set in the user information is identified. The tenant ID is sent to the first terminal 20.

Figure 8:
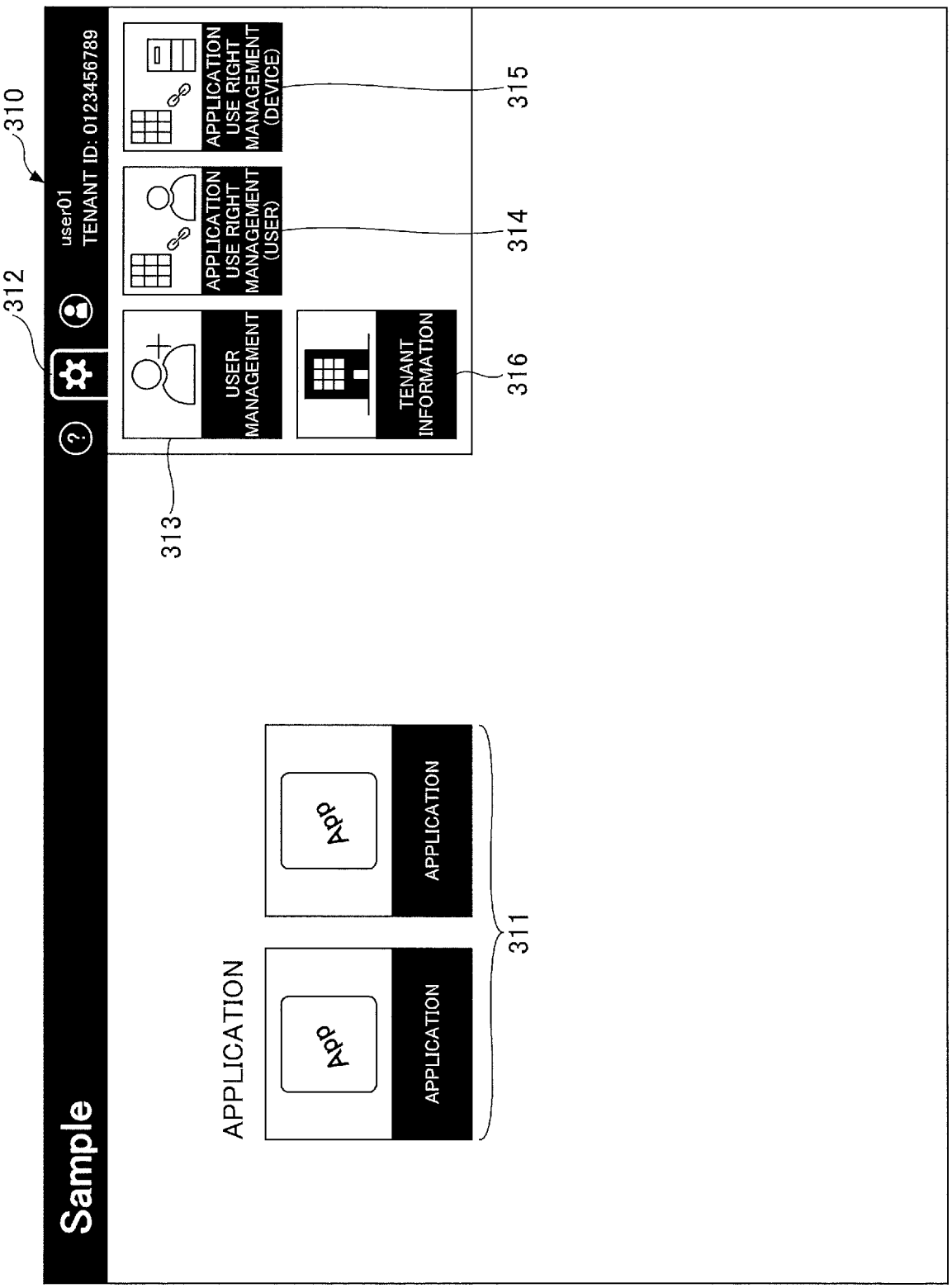
FIG. 8 is a drawing illustrating an example of a top screen displayed by the first terminal.

S3: After logging into the cloud system 50, the display controller 23 of the first terminal 20 displays a top screen based on screen information of the top screen received from the cloud system 50. FIG. 8 illustrates an example of a top screen. As described with reference to FIG. 8, the administrator C performs operations to transition screens (see FIG. 9) and cause the first terminal 20 to display a user registration URL generation screen. The operation receiver 24 of the first terminal 20 receives the operations.

S4: The first communication unit 22 of the first terminal 20 sends a request for the user registration URL generation screen together with the tenant ID to the cloud system 50. The fourth communication unit 52 of the cloud system 50 receives the request for the user registration URL generation screen, and the URL issuer 53 generates the user registration URL generation screen for the tenant identified by the tenant ID. This is because items set by the administrator C vary depending on the tenant.

S5: The fourth communication unit 52 of the cloud system 50 sends screen information of the user registration URL generation screen to the first terminal 20.

S6: The first communication unit 22 of the first terminal 20 receives the screen information of the user registration URL generation screen, and the display controller 23 displays the user registration URL generation screen on the display 506. At this stage, the user registration URL generation screen does not include a user registration URL. FIG. 10 illustrates an example of the user registration URL generation screen.

S7: The administrator C inputs information (parameters) on the user registration URL generation screen. Details are described with reference to FIG. 10. The operation receiver 24 of the first terminal 20 receives the information input on the user registration URL generation screen.

S8: The administrator C presses a "GENERATE" button on the user registration URL generation screen. The operation receiver 24 of the first terminal 20 receives the pressing of the "GENERATE" button.

S9: The first communication unit 22 of the first terminal 20 sends the information (parameters) entered on the user registration URL generation screen to the cloud system 50 together with a user registration URL generation request.

S10: The fourth communication unit 52 of the cloud system 50 receives the user registration URL generation request and the information entered on the user registration URL generation screen, and the URL issuer 53 generates a user registration URL. The URL issuer 53 generates a user registration URL that includes the tenant ID identified in the login process of the administrator and a numbered code. The URL issuer 53 also generates URL information. The URL issuer 53 generates a user registration URL generation screen that includes the user registration URL. The fourth communication unit 52 of the cloud system 50 sends screen information of the user registration URL generation screen to the first terminal 20.

S11: The first communication unit 22 of the first terminal 20 receives the screen information of the user registration URL generation screen, and the display controller 23 displays the user registration URL generation screen on the display 506. FIG. 11 illustrates an example of the user registration URL generation screen (an example of an administrator web page) that includes the user registration URL.

The administrator C copies the user registration URL displayed on the user registration URL generation screen, generates an email message directed to email addresses of users U obtained from an address book storing the email addresses of the users U, and pastes the user registration URL onto the email message. The first terminal 20 sends this email message to the users U. The user registration URL may be sent not only via email but also via a social network system (SNS) or an electronic bulletin board.

<<Screen Examples>>

FIG. 7 is an example of a login screen 300 displayed by the first terminal 20. The login screen 300 includes a user ID field 301, a password field 302, and a login button 303. The administrator C inputs a user ID (for example, an email address) in the user ID field 301 and inputs a password in the password field 302. The user ID and the password are examples of authentication information. When the administrator C presses the login button 303, a login request is sent to the cloud system 50.

FIG. 8 is an example of a top screen 310 displayed by the first terminal 20. When authentication for the login request of FIG. 7 is successful, the first terminal 20 displays the top screen 310. On the top screen 310, a list 311 of applications for which the administrator C has use rights in the user information is displayed. The same applies to a general user U. The top screen 310 also includes a setting button 312. When the administrator C presses the setting button 312, buttons such as user management 313, application use right management (user) 314, application use right management (device) 315, and tenant information 316 are displayed. The user management 313 is a button for displaying a user management screen used by the administrator C to manage users U. The application use right management (user) 314 is a button for displaying a screen for managing application use rights of users U. The application use right management (device) 315 is a button for displaying a screen for managing application use rights of electronic apparatuses 10. The tenant information 316 is a button for displaying a screen that displays, for example, contract information of the tenant.

FIG. 9 is an example of a user management screen 320. When the user management 313 in FIG. 8 is pressed, the user management screen 320 is displayed.

The user management screen 320 displays user information of users in the tenant managed by the administrator C. The user management screen 320 includes a role 321, a state 322, and a search field 323 for searching for users U with free words. The user management screen 320 also includes a menu button 324, a register button 325, a delete button 326, a validate button 327, and an invalidate button 328. The register button 325 is used by the administrator C to register a user U. The delete button 326 is used to delete user information. The activate button 327 is used to activate the account of a user U. The invalidate button 328 is used to invalidate the account of a user U.

The user management screen 320 displays a list of users U that match (or hit) a search term. Each record in the list of users U includes a role 329, a user ID 330, an email address 331, a last name 332, a first name 333, an account state 334, an external system email address 335, and an external system account name 336. Except for the external system email address 335 and the external system account name 336, these information items are registered in the user information. The external system is a commercial cloud service such as a storage service or a schedule management service.

FIG. 9 illustrates a state where the menu button 324 is pressed. When the menu button 324 is pressed, the following menu items are displayed: "import (file generated from format)" 337 for importing user information, "import (file exported from active directory)" 338, "send all user registration emails" 339, "send all email address confirmation emails" 340, "edit user registration email format" 341, and "generate user registration URL" 342. When the "generate user registration URL" 342 is pressed, the user registration URL generation screen is displayed. Thus, pressing the "generate user registration URL" 342 is an operation performed by the administrator C to request the cloud system 50 to generate a user registration URL.

FIG. 10 illustrates an example of a user registration URL generation screen 350. The user registration URL generation screen 350 includes a general user registration tag 357 and an administrator registration tag 358. Depending on which one of the tags is selected by the administrator C, a user registration URL for general users or a user registration URL for the administrator C is generated.

The user registration URL generation screen 350 includes a user registration URL field 351, a validity period field 352, a user registration upper limit field 353, an application use right setting field 354, and an application list 355. In the user registration URL field 351, a user registration URL is automatically displayed as described with reference to FIG. 11. The user registration URL to be generated is for registering users U in a tenant to which the logged-in administrator C belongs. A URL for registering users in a different tenant cannot be generated. That is, the tenant is determined by the logged-in administrator C or the specification of the tenant by the administrator C.

When a user is registered using a user registration URL generated with the general user registration tag 357, the user is registered as a general user. When a user is registered using a user registration URL generated with the administrator registration tag 358, the user is registered as an administrator C.

Information entered by the administrator C in the validity period field 352 and the user registration upper limit field 353 is registered in URL information. The user registration URL generation screen 350 may also include an expiration date field. When there is no upper limit for the number of users per tenant, it is not necessary to set the user registration upper limit (in this example, no upper limit).

The application use right setting field 354 indicates whether the administrator C sets applications whose use rights are automatically given to the user U when the user U registers user information. When "Specify" is selected in the application use right setting field 354, the administrator C can select applications in the application list 355. The applications selected in this field are registered in the "use-right-assigned application ID list" in the URL information.

Here, the "user registration screen URL", the "redirection URL for successful registration", and the "redirection URL for failed registration" in the URL information are automatically set by the URL issuer 53. The user ID of the logged-in administrator C is set as the author in the URL information. The default value of the "state" in the URL information is "valid".

When the administrator C presses a generate button 356, the URL issuer 53 generates a user registration URL, and the first terminal 20 displays the user registration URL generation screen 350 including the user registration URL.

FIG. 11 illustrates an example of the user registration URL generation screen 350 that includes a user registration URL. Compared with FIG. 10, the user registration URL is displayed in the user registration URL field 351. Also, a copy button 359 is displayed. As described above, the user registration URL includes a tenant ID associated with the logged-in administrator C in the user information and a code that identifies the user registration URL. When the user registration URL generation screen 350 of FIG. 11 is displayed, the user registration URL is registered in the URL information.

Figure 12:
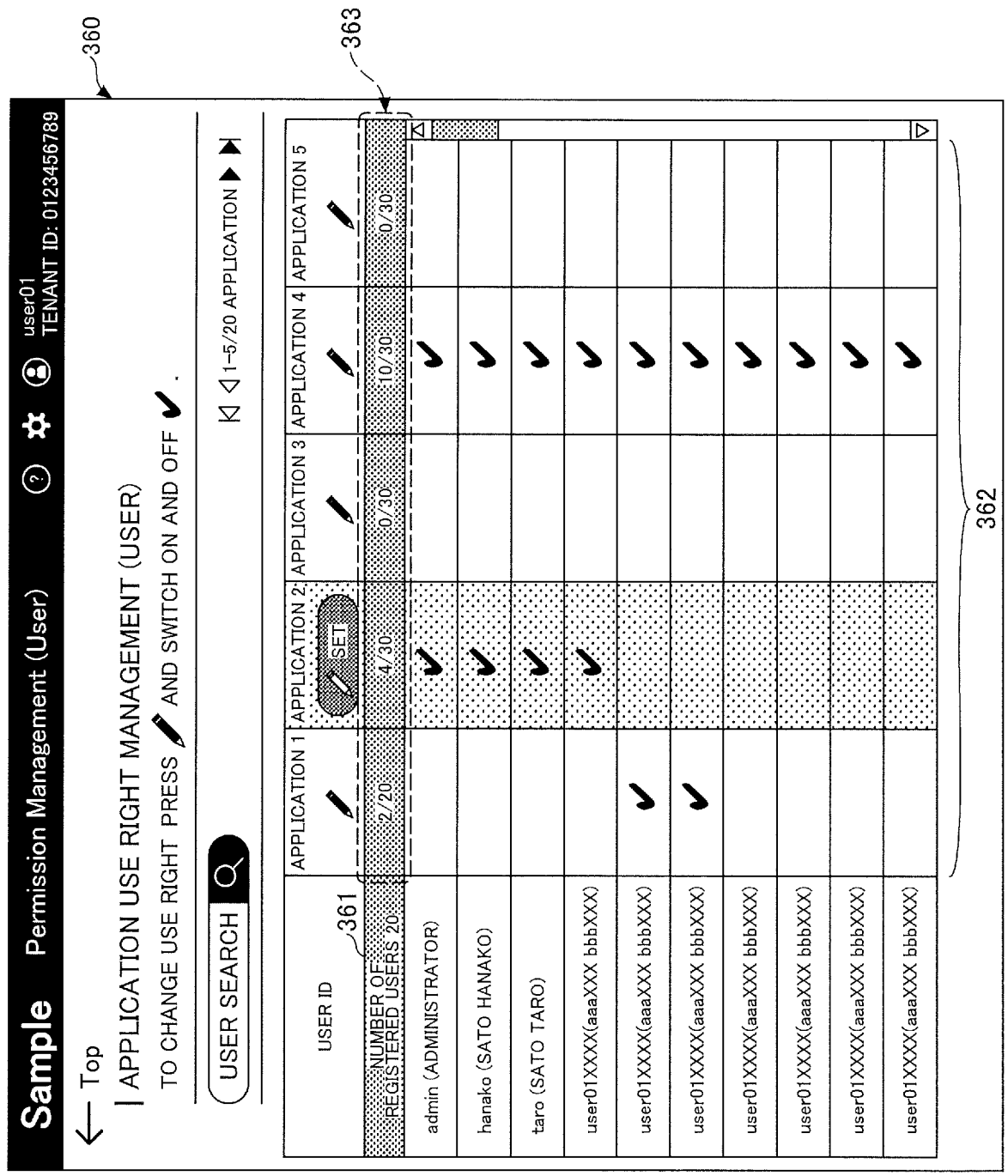
FIG. 12 is a drawing illustrating an example of a use right management screen displayed by the first terminal.

FIG. 12 is an example of a use right management screen 360. The use right management screen 360 is displayed when the application use right management (user) 314 is pressed on the top screen 310 in FIG. 8. The use right management screen 360 displays use rights 362 of applications in association with user IDs 361. Each user U can use applications whose use rights 362 are checked. The maximum number of licenses (denominator) is set for each application in a use right status 363 of each application, and the current number of used licenses (numerator) is also displayed. The "usable application information list" in the user information of each user is reflected in the use rights 362. The administrator C can set and cancel use rights of applications for each user U on the use right management screen 360.

<User Information Registration Process>

Figure 13:
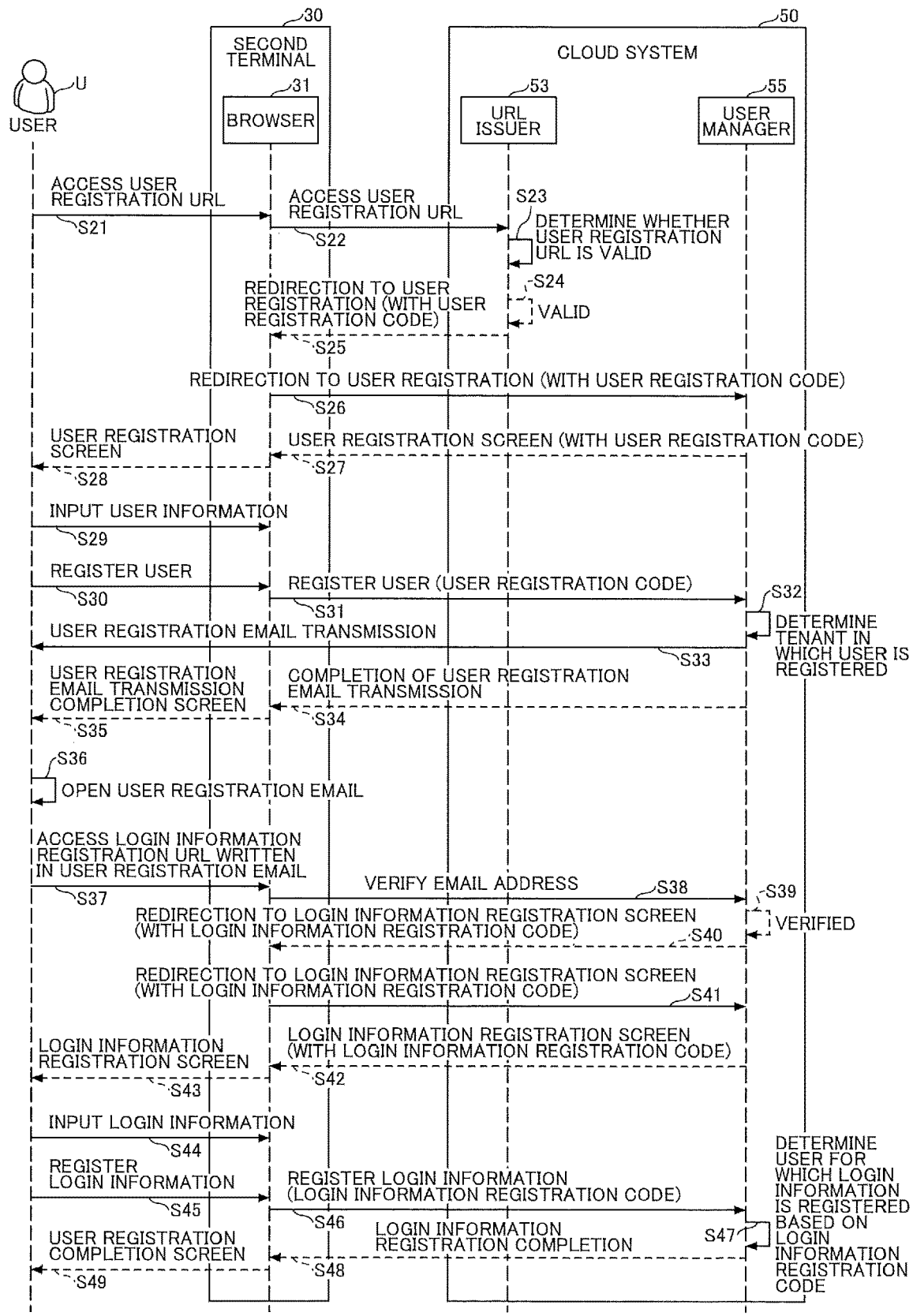
FIG. 13 is a flowchart illustrating an example of a process where a user operates the second terminal to register user information in the cloud system.

Next, a process where the user U registers user information using a user registration URL is described with reference to FIG. 13. FIG. 13 is a flowchart illustrating a process where the user U operates the second terminal 30 to register user information in the cloud system 50.

S21: The user U receives email including a user registration URL from the administrator C. The user U displays the email on the second terminal 30. The user U who wants to perform user registration specifies the user registration URL as the communication destination of the second terminal 30. For example, the user U may click the user registration URL in the email, or copy the user registration URL and paste the user registration URL into the URL field of the web browser. The operation receiver 34 of the second terminal 30 receives the specification of the user registration URL.

S22: The second communication unit 32 of the second terminal 30 connects to the cloud system 50 with the user registration URL as the communication destination.

S23: The fourth communication unit 52 of the cloud system 50 accepts the communication to the user registration URL and obtains a tenant ID and a code included in the user registration URL. First, the URL issuer 53 identifies URL information based on the code and determines whether the "state" in the URL information is valid.

Figure 14A:
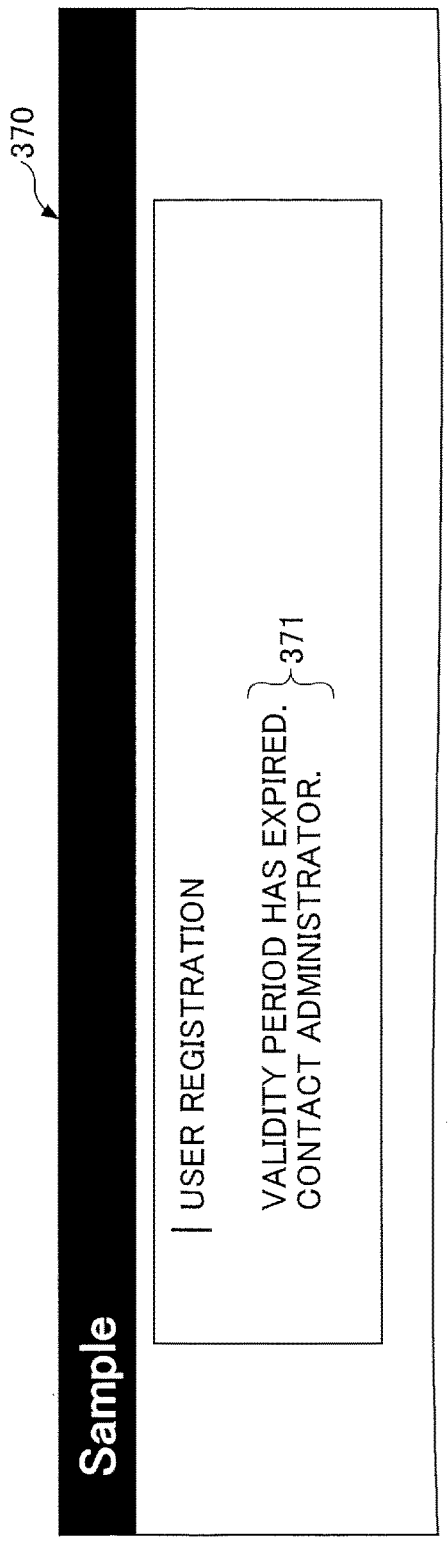
FIGS. 14A through 14C are drawings illustrating examples of error screens displayed by the second terminal.
Figure 14B:
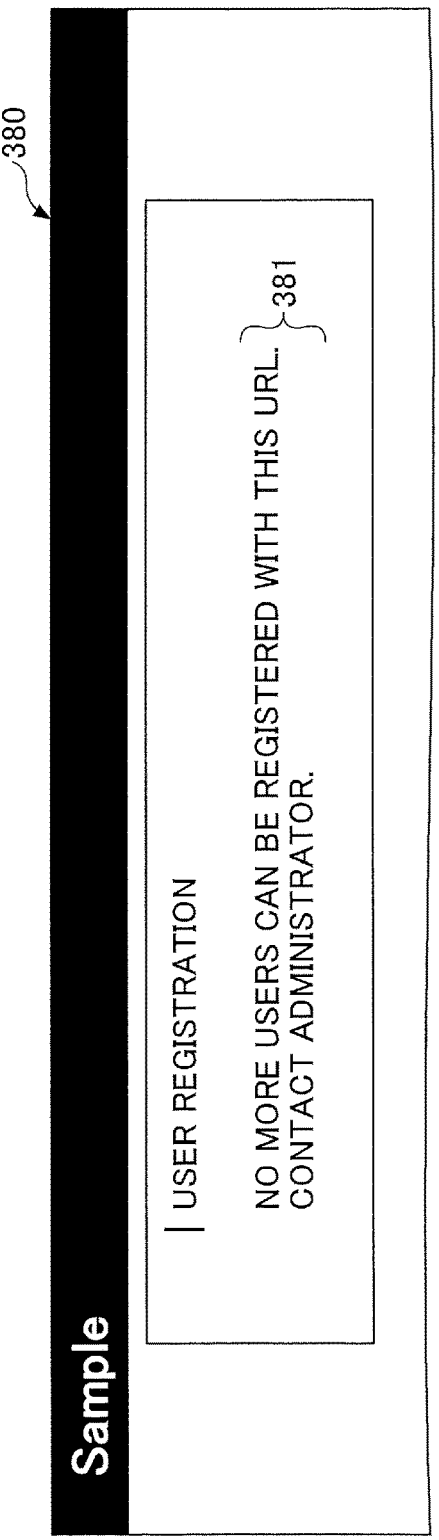

S24: In this example, it is assumed that the "state" is valid. If the "state" is invalid, the URL issuer 53 reports an error using the "redirection URL for failed registration" in the URL information. FIGS. 14A and 14B illustrate examples of error report screens.

S25: The URL issuer 53 sends the "user registration screen URL" in the URL information to the second terminal 30 via the fourth communication unit 52 together with a redirect request and the code (user registration code in FIG. 13). The code may be attached to the header of a communication protocol such as HTTP or may be included in the body.

S26: The second communication unit 32 of the second terminal 30 receives the redirect request with the "user registration screen URL" as a communication destination. Then, the second communication unit 32 attaches the code to the "user registration screen URL" and connects to the "user registration screen URL". In FIG. 13, the connection destination is the user manager 55.

S27: The fourth communication unit 52 of the cloud system 50 receives the communication to the "user registration screen URL", and the user manager 55 generates screen information of the user registration screen. The user manager 55 sends the screen information of the user registration screen and the code to the second terminal 30 via the fourth communication unit 52.

S28: The second communication unit 32 of the second terminal 30 receives the screen information of the user registration screen and the code, and the display controller 33 displays the user registration screen on the display 506. FIG. 15 illustrates an example of the user registration screen.

S29: The user U inputs user information on the user registration screen. The operation receiver 34 of the second terminal 30 receives the input of the user information.

S30: The user U presses a register button on the user registration screen. The operation receiver 34 of the second terminal 30 receives this operation.

S31: The second communication unit 32 of the second terminal 30 sends a registration request together with the user information and the code to the cloud system 50.

S32: The fourth communication unit 52 of the cloud system 50 receives the registration request together with the user information and the code, and the user manager 55 identifies the URL information based on the code and determines a tenant in which the user U is to be registered.

Figure 14C:
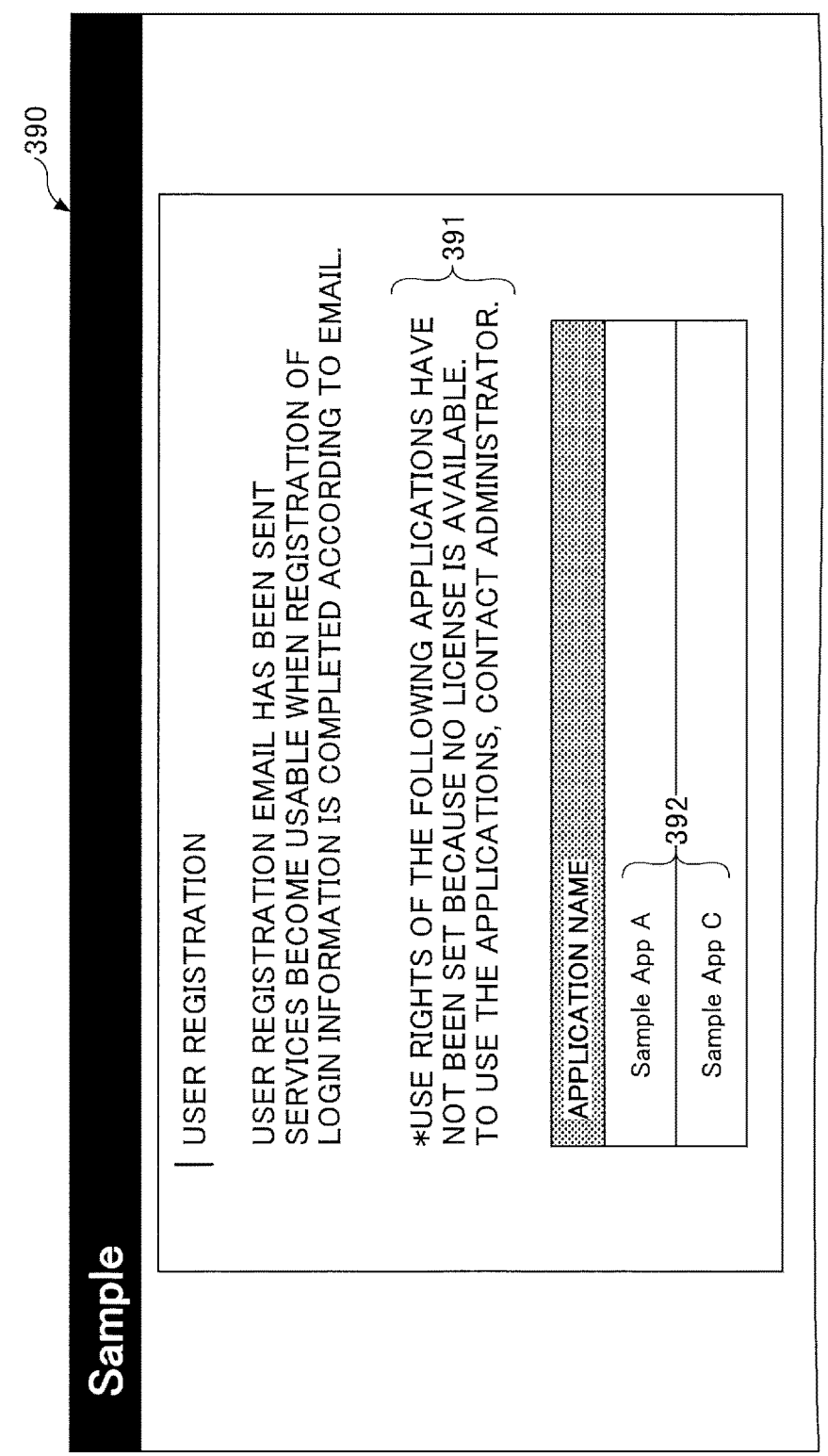

Also, the user manager 55 determines applications to be set in the "usable application information list" in the user information based on the "use-right-assigned application ID list" in the URL information. However, because a registration limit is set for each application according to, for example, a contract as described with reference to FIG. 12, the user manager 55 assigns use rights of applications to the user U within the registration limits of those applications. For example, if the registration limit of an application A is 20 and the use right of the application A has already been given to 20 users U in a tenant, the user manager 55 does not give the use right of the application A to the user U even if the application A is in the "use-right-assigned application ID list". In this case, the user manager 55 preferably sends an error message including the identification information of the application A to the second terminal 30. FIG. 14C illustrates an example of an error report screen.

Accordingly, the user manager 55 registers a tenant ID, a user ID, a last name, a first name, an email address, language, a role, and a usable application information list in the user information. This is referred to as "temporary registration". At this point, the state of the account is "invalid". The password is registered at the official registration. The temporary registration is a state where the email address of the user U has not been verified and no password is registered. The official registration is a state where the email address has been verified and a password has been registered.

S33: The user manager 55 sends user registration email (indicating completion of temporary registration) to the user U via the fourth communication unit 52.

S34: Also, the user manager 55 sends a user registration email transmission completion message to the second terminal 30 via the fourth communication unit 52. The user registration email transmission completion message includes a URL for verifying the email address. This URL is associated with the user ID, and the verification of the email address of the user U is completed when the second terminal 30 is connected to this URL.

Figure 16:
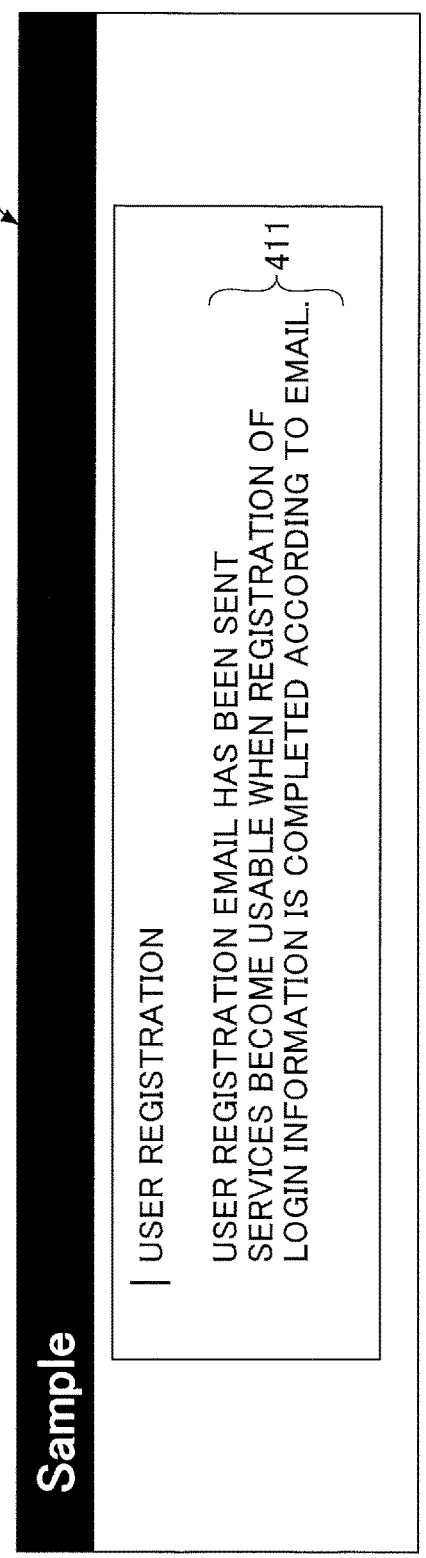
FIG. 16 is a drawing illustrating an example of a user-registration-email transmission completion screen displayed by the second terminal.

S35: The second communication unit 32 of the second terminal 30 receives the user registration email transmission completion message, and the display controller 33 displays a user-registration-email transmission completion screen on the display 506. FIG. 16 illustrates an example of the user-registration-email transmission completion screen.

S36: The user U recognizes that the temporary registration is completed based on the user-registration-email transmission completion screen and displays the email addressed to itself.

S37: The user U sets the URL, which is written in the email and used to verify an email address, as a communication destination. For example, the user U may click the URL that is written in the email and for verifying the email address, or may copy the URL for verifying the email address and paste the URL into the URL field of the web browser. The operation receiver 34 of the second terminal 30 receives the specification of the URL for verifying the email address.

S38: The second communication unit 32 of the second terminal 30 connects to the cloud system 50 by using the URL for verifying the email address as a communication destination.

S39: The fourth communication unit 52 of the cloud system 50 receives the communication to the URL for verifying the email address. Because this URL is associated with the user ID, the user manager 55 can verify that the email address included in the user information belongs to the user U.

S40: The user manager 55 sends a URL of a login information registration screen to the second terminal 30 via the fourth communication unit 52 together with a redirect request and a login information registration code. The login information registration code is associated with the user ID.

S41: The second communication unit 32 of the second terminal 30 receives the redirect request having the URL of the login information registration screen as a communication destination. Then, the second communication unit 32 attaches the login information registration code to the URL of the login information registration screen and connects to the URL of the login information registration screen. The login information registration code may be attached as a query string of the URL or may be included in the body of the URL.

S42: The fourth communication unit 52 of the cloud system 50 receives the communication to the URL of the login information registration screen, and the user manager 55 generates screen information of the login information registration screen. The user manager 55 sends the screen information of the login information registration screen and the login information registration code to the second terminal 30 via the fourth communication unit 52.

S43: The second communication unit 32 of the second terminal 30 receives the screen information of the login information registration screen and the login information registration code, and the display controller 33 displays the login information registration screen on the display 506. FIG. 17 illustrates an example of a login information registration screen.

S44: The user U inputs a password on the login information registration screen. The operation receiver 34 of the second terminal 30 receives the input of the password.

S45: The user U presses a register button on the login information registration screen. The operation receiver 34 of the second terminal 30 receives this operation.

S46: The second communication unit 32 of the second terminal 30 sends a registration request together with the password and the login information registration code to the cloud system 50.

S47: The fourth communication unit 52 of the cloud system 50 receives the registration request together with the password and the login information registration code, and the user manager 55 identifies the user U for which the login information is to be registered based on the login information registration code. The user manager 55 registers the password in the user information of the identified user U.

Because the verification of the email address of the user U is completed and the password is registered, the user manager 55 sets the state of the account in the user information to "valid". As a result, the user information is officially registered.

S48: The user manager 55 sends a login information registration completion message to the second terminal 30 via the fourth communication unit 52.

S49: The second communication unit 32 of the second terminal 30 receives the login information registration completion message, and the display controller 33 displays a login information registration completion screen on the display 506. Because the login information is registered, the second terminal 30 automatically logs into the cloud system 50 and displays the top screen.

The user U becomes able to log into the cloud system 50 from the electronic apparatus 10 or the second terminal 30 using the registered user ID. Because applications whose use rights are assigned to the user U are registered in the user information, the user U can use the applications.

Thus, the cloud system 50 issues a user information registration URL for each tenant, and registers a user connected to the user information registration URL in the corresponding tenant for which the user information registration URL is issued.

Also, the cloud system 50 issues a user information registration URL for each role in the tenant, and the user manager 55 registers a user connected to the user information registration URL in the tenant as the user with a role identified based on the user information registration URL.

<<Screen Examples>>

FIGS. 14A through 14C are drawings illustrating examples of error screens displayed by the second terminal 30. FIG. 14A illustrates an error screen 370 that is displayed when the user registration URL is invalid. Specifically, the error screen 370 is displayed due to the expiration of the validity period that is one of the reasons for which the user registration URL is invalidated. Accordingly, the error screen 370 of FIG. 14A displays a message 371 "The validity period of URL has expired. Contact administrator". With this message, the user U can notice that the user U has not been registered in the tenant.

FIG. 14B illustrates an error screen 380 that is displayed when the user registration URL is invalid. Specifically, the error screen 380 is displayed when the remaining number of registrable users is zero, which is one of the reasons for which the user registration URL is invalidated. Accordingly, the error screen 380 of FIG. 14B displays a message 381 "No more users can be registered with this URL. Contact administrator". With this message, the user U can notice that the user U has not been registered in the tenant.

FIG. 14C illustrates an error screen 390 that is displayed when there are applications whose registration limits are exceeded. Therefore, the error screen 390 of FIG. 14C displays a message 391 "Use rights of the following applications have not been set because no license is available. To use the applications, contact administrator" and application names 392 of the applications whose use rights have not been registered. With the error screen 390, the user U can confirm the names of applications whose use rights cannot be registered.

FIG. 15 is an example of a user registration screen 400 displayed by the second terminal 30. The user registration screen 400 includes a user ID field 401, an email address field 402, a last name field 403, a first name field 404, an email transmission language field 405, and a register button 406. The user U enters a user ID in the user ID field 401, enters an email address in the email address field 402, enters a last name in the last name field 403, enters a first name in the first name field 404, sets a language in the email transmission language field 405, and presses the register button 406. When the register button 406 is pressed, the user registration screen 400 transitions to a user-registration-email transmission completion screen of FIG. 16.

FIG. 16 illustrates an example of a user-registration-email transmission completion screen 410 displayed by the second terminal 30. The user-registration-email transmission completion screen 410 displays a message 411 "User registration email has been sent. Services become usable when registration of login information is completed according to email". The message 411 indicates that the user U needs to open the email and register login information. When the second terminal 30 connects to the URL in the email, a login information registration screen of FIG. 17 is displayed.

FIG. 17 is an example of a login information registration screen 420 displayed by the second terminal 30. The login information registration screen 420 includes a user ID field 421, an email address field 422, a last name field 423, a first name field 424, a new password field 425, and a new password field (confirmation) 426. The user ID field 421, the email address field 422, the last name field 423, and the first name field 424 are similar to the corresponding fields in FIG. 15. Values have already been set in these fields by the cloud system 50.

The user U sets the same password in the new password field 425 and the new password field (confirmation) 426, and presses a register button 427. When the register button 427 is pressed, the user information is officially registered.

<Login of User to Electronic Apparatus>

Figure 18:
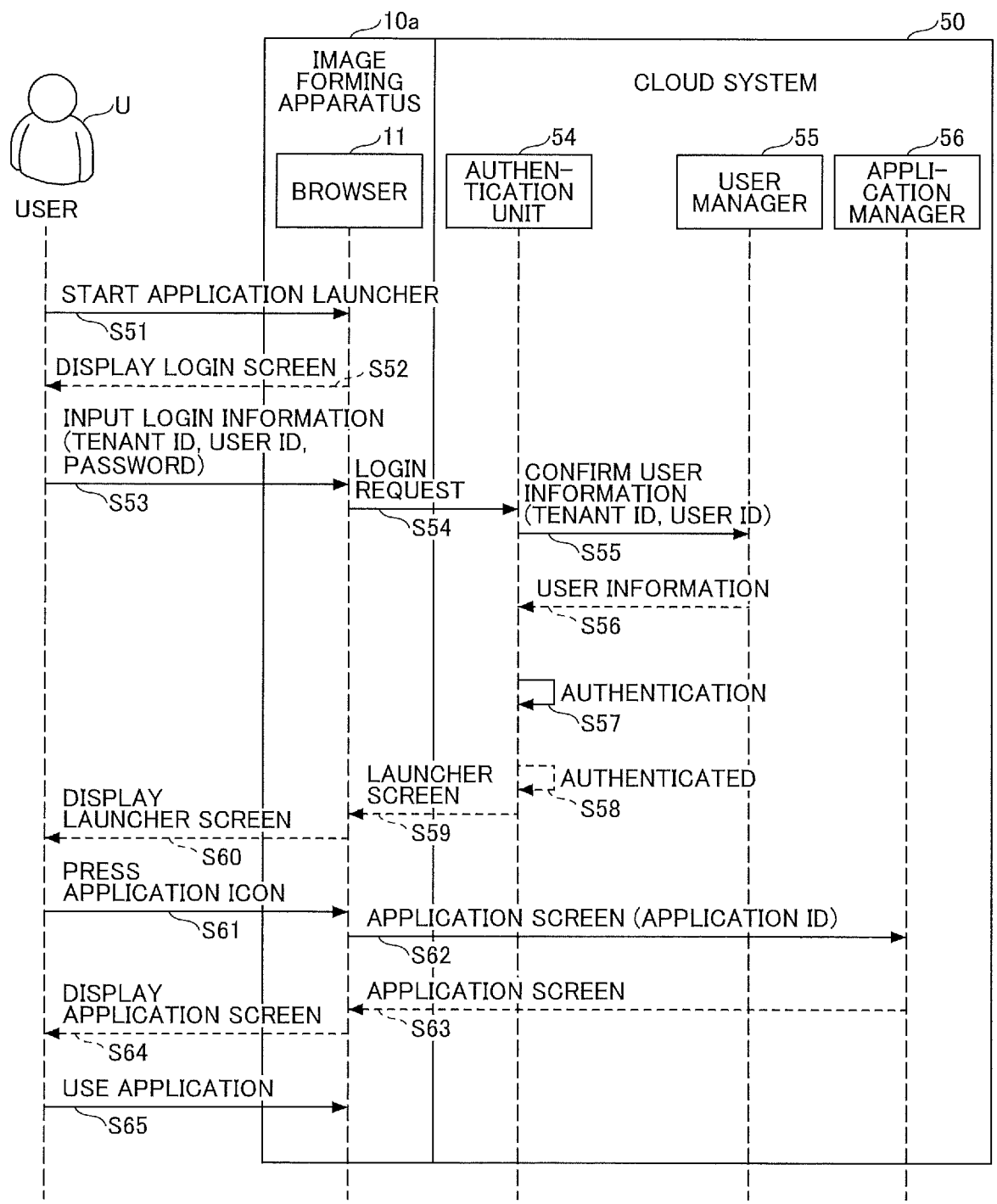
FIG. 18 is a sequence chart illustrating an example of a process where a user logs into an electronic apparatus.

Next, a process where the user U logs into the electronic apparatus 10 is described with reference to FIG. 18. FIG. 18 is a sequence chart illustrating an example of a process where the user U logs into the electronic apparatus 10.

Figure 19:
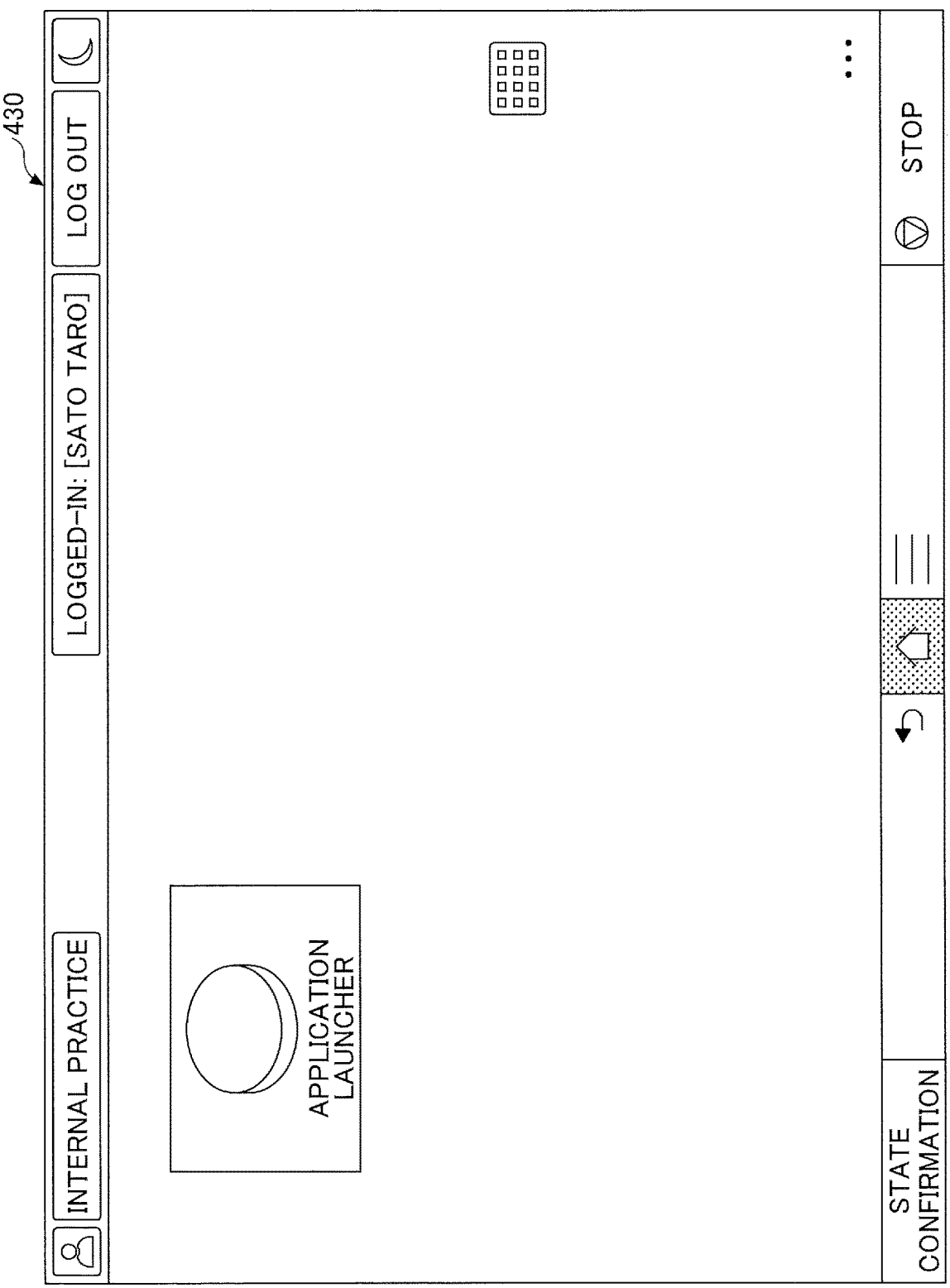
FIG. 19 is a drawing illustrating an example of a standby screen displayed on an operations panel of an image forming apparatus.

S51: First, the user U displays an application launcher from a standby screen displayed on the operations panel 940. FIG. 19 illustrates an example of a standby screen. The application launcher is an application for displaying a list of applications (=launcher screen) that are registered in the cloud system 50 and usable by the logged-in user U. Similarly to other applications, the application launcher is also displayed as an icon. The user U presses the icon of the application launcher. The operation receiver 14 of the image forming apparatus 10a receives the selection of the application launcher.

Figure 20:
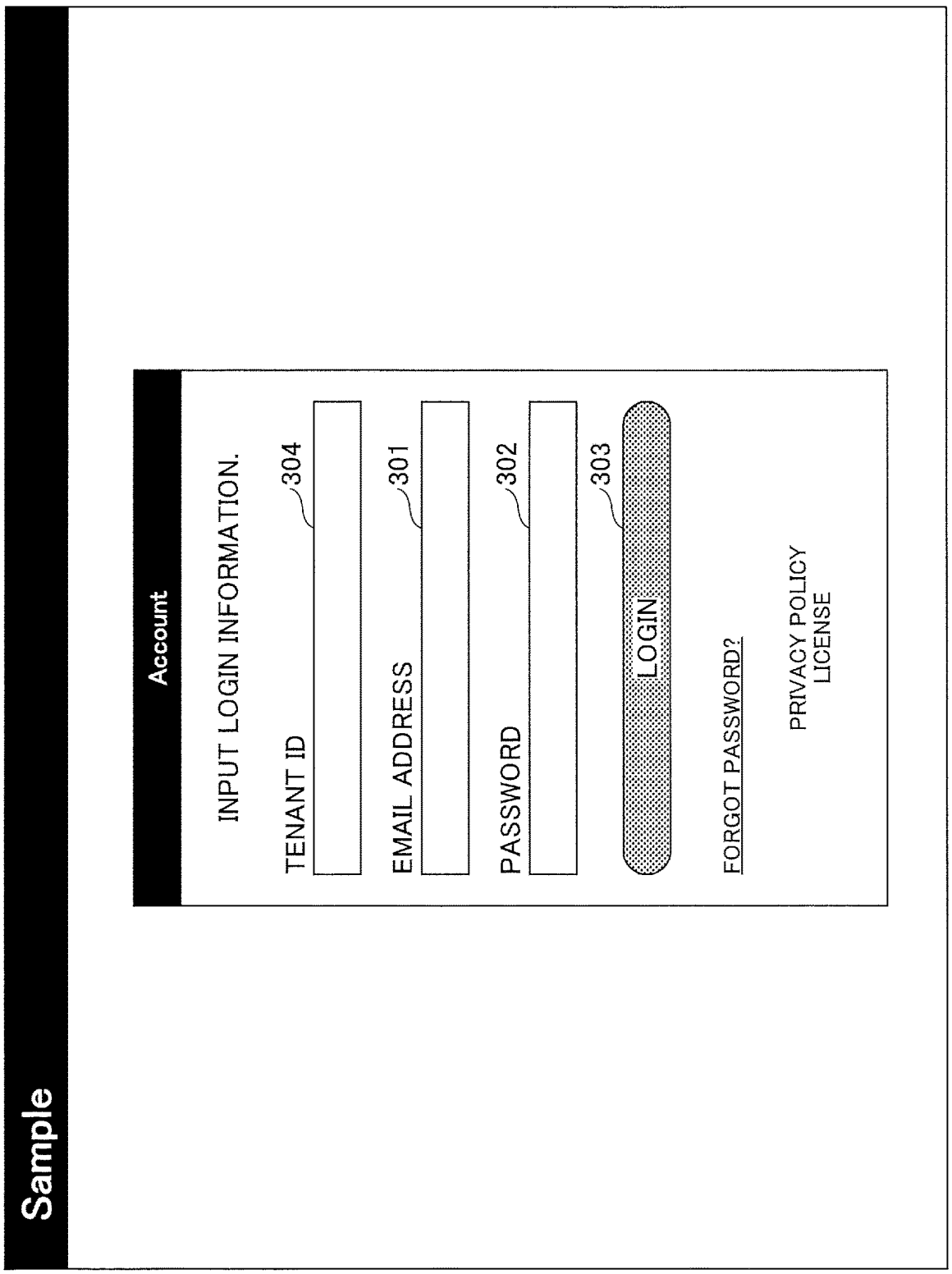
FIG. 20 is a drawing illustrating an example of a login screen displayed on the operations panel of the image forming apparatus.

S52: In response to this operation, the display controller 13 displays a login screen on the operations panel 940. FIG. 20 illustrates an example of a login screen.

S53: On the login screen, the user U performs an operation to log into the cloud system 50 (inputs authentication information). The user U may input "user ID and password" or "tenant ID, user ID (or email address), and password". The operation receiver 14 of the image forming apparatus 10a receives the input of the authentication information.

S54: The third communication unit 12 of the image forming apparatus 10a sends a login request together with the authentication information to the cloud system 50.

S55, S56: The fourth communication unit 52 of the cloud system 50 receives the login request, and the authentication unit 54 requests user information from the user manager 55 by specifying the tenant ID and the user ID.

S57: The authentication unit 54 authenticates the user U based on the user information obtained from the user manager 55.

S58: In the present embodiment, it is assumed that the authentication has been successful. As a result, the "usable application information list" registered in the user information of the user U is identified.

S59: When the authentication succeeds, the authentication unit 54 of the cloud system 50 generates screen information of the launcher screen. A list of applications is displayed on the launcher screen. The applications displayed on the launcher screen include applications whose use rights are assigned to the user U as registered in the "usable application information list" in the user information and applications that can be used without use rights. Thus, after logging into the image forming apparatus 10a, the user U can display applications whose use rights are assigned to the user U. The fourth communication unit 52 of the cloud system 50 sends the screen information of the launcher screen to the image forming apparatus 10a.

Figure 21:
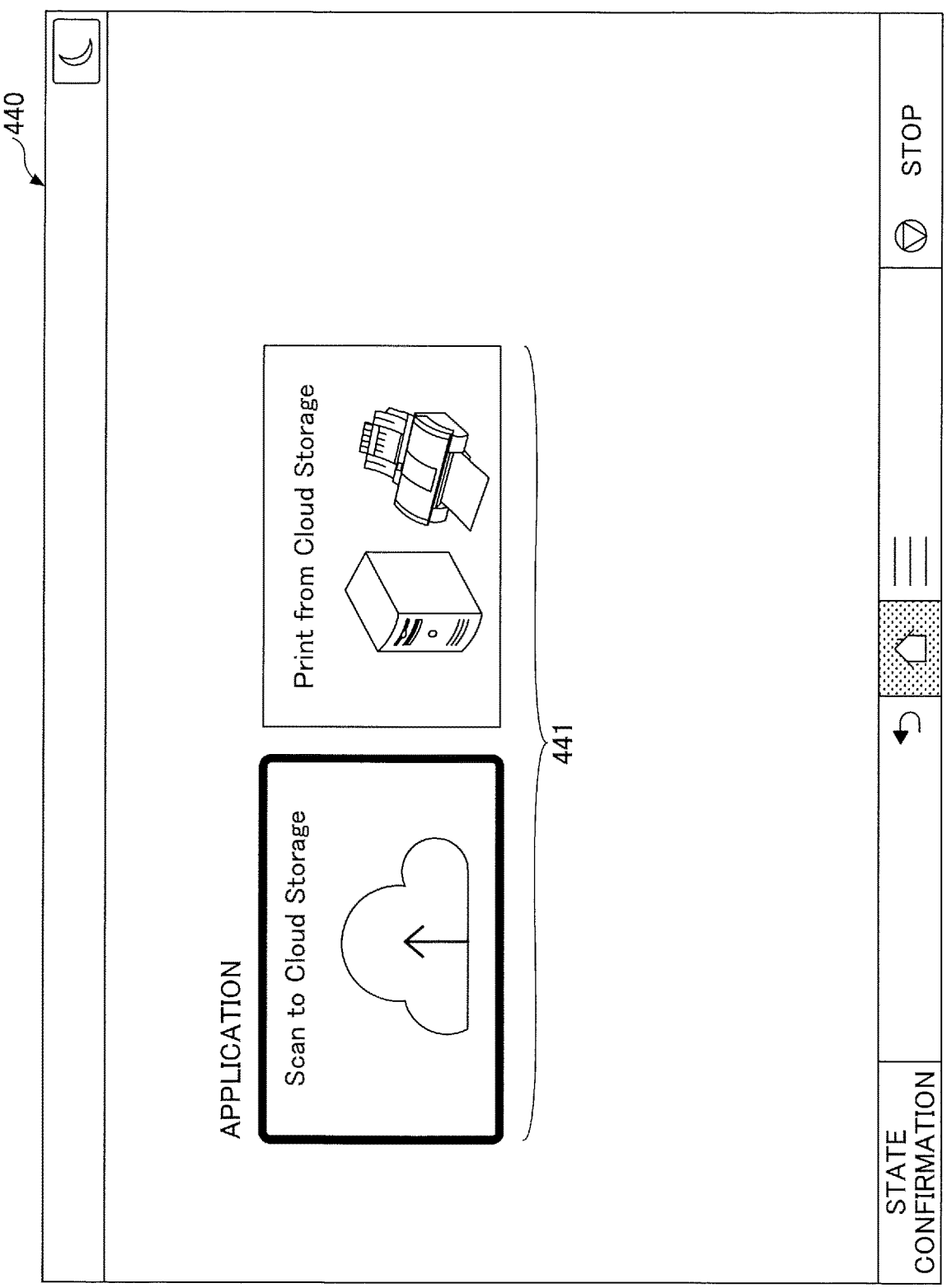
FIG. 21 is a drawing illustrating an example of a launcher screen displayed on the operations panel of the image forming apparatus.

S60: The third communication unit 12 of the image forming apparatus 10a receives the screen information of the launcher screen, and the display controller 13 displays the launcher screen on the operations panel 940. FIG. 21 illustrates an example of the launcher screen. Examples of applications displayed on the launcher screen include web applications that are available for the tenant such as workflow applications generated using a workflow generation tool.

S61: The user U presses an icon of an application on the launcher screen. The operation receiver 14 of the image forming apparatus 10a receives the selection of the application.

S62: The third communication unit 12 of the image forming apparatus 10a sends a request for an application screen to the cloud system 50 together with an application ID of the application selected by user U.

S63: The fourth communication unit 52 of the cloud system 50 receives the request for the application screen specified by the application ID, and the application manager 56 generates screen information of the application screen identified by the application ID. The fourth communication unit 52 sends the screen information of the application screen to the image forming apparatus 10a. The application manager 56 applies default settings set by the user U as described later to the screen information of the application screen.

Figure 22:
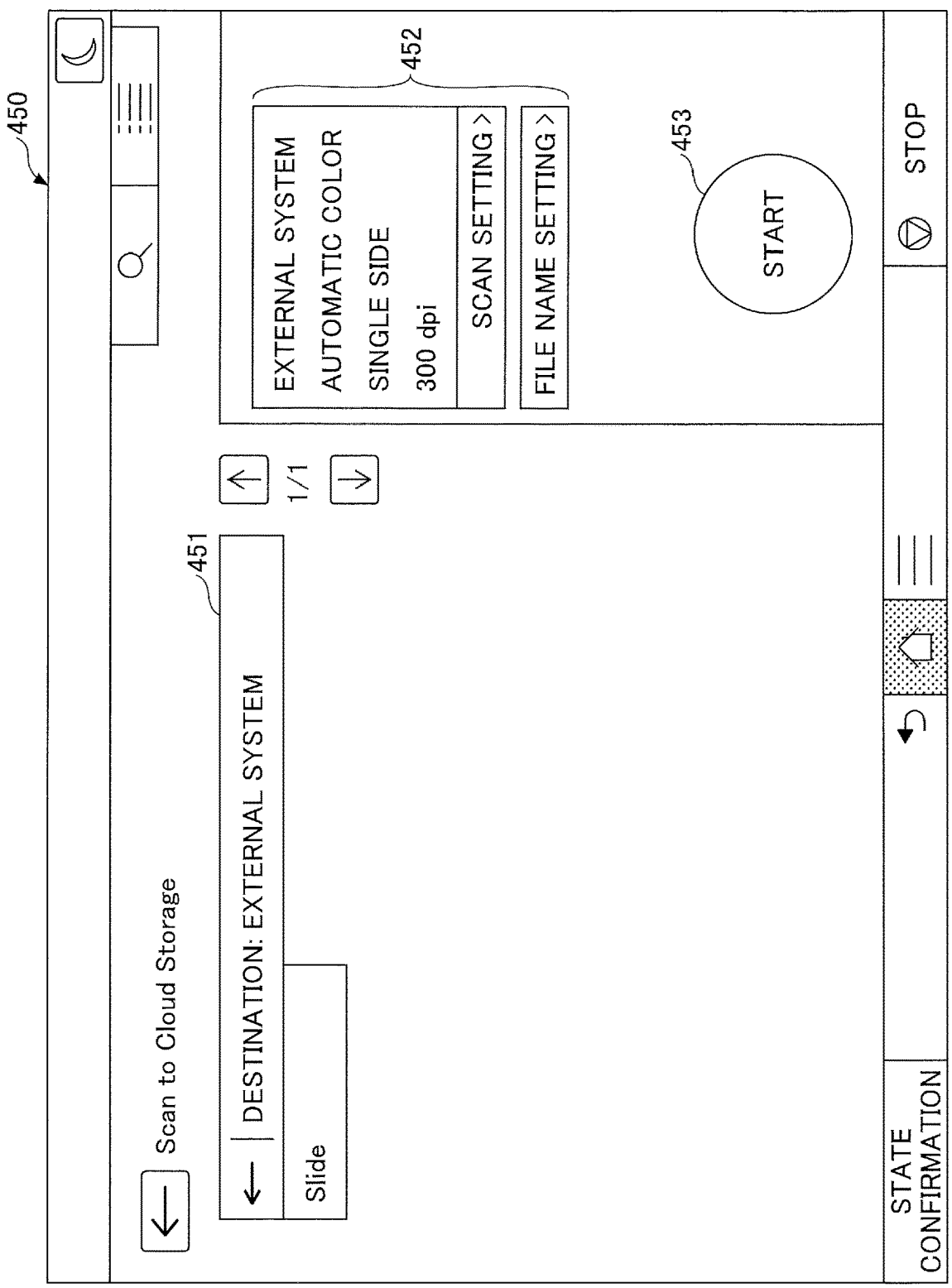
FIG. 22 is a drawing illustrating an example of an application screen displayed on the operations panel of the image forming apparatus.

S64: The third communication unit 12 of the image forming apparatus 10a receives the screen information of the application screen, and the display controller 13 displays the application screen on the operations panel 940 based on the screen information of the application screen. FIG. 22 illustrates an example of the application screen. The application screen depends on the type of application selected by the user U on the launcher screen.

S65: The user U operates and uses the application on the application screen.

<<Screen Examples>>

FIG. 19 illustrates an example of a standby screen 430 displayed on the operations panel of the image forming apparatus 10a. An application launcher icon 431 is displayed on the standby screen 430. Even if the user U changes, the application launcher icon 431 is the same. However, the application screen displayed when the user U presses the application launcher icon 431 may vary depending on the user U, and displays applications whose use rights are assigned to the user U (i.e., applications that may vary depending on the user U) and applications that are usable without use rights. When the application launcher icon 431 is pressed, the launcher screen is displayed after login. Also, the standby screen 430 may be displayed after login.

FIG. 20 illustrates an example of a login screen 300 displayed on the operations panel 940. Compared with the login screen 300 of FIG. 7, the login screen of FIG. 20 includes a tenant ID field 304. Thus, the user U can also perform a login operation by specifying a tenant ID. The first terminal 20 may display the login screen of FIG. 20, and the image forming apparatus 10a may display the login screen of FIG. 7.

FIG. 21 is a drawing illustrating an example of a launcher screen 440 displayed on the operations panel 940 of the image forming apparatus 10a. The launcher screen 440 includes icons 441 of one or more applications. In FIG. 21, "Scan to Cloud Storage" and "Print From Cloud Storage" are displayed. When an application is selected, the corresponding application screen is displayed.

FIG. 22 is a drawing illustrating an example of an application screen 450 displayed on the operations panel 940 of the image forming apparatus 10a. FIG. 22 illustrates an application screen of "Scan to Cloud Storage". The application screen 450 includes a destination field 451, a scan setting field 452, and a start button 453. Default settings described later are applied to the destination field 451 and the scan setting field 452. If there is no problem with the default settings, the user U can use the application by just pressing the start button 453 without changing the default settings.

<User Operations after User Registration>

Figure 23:
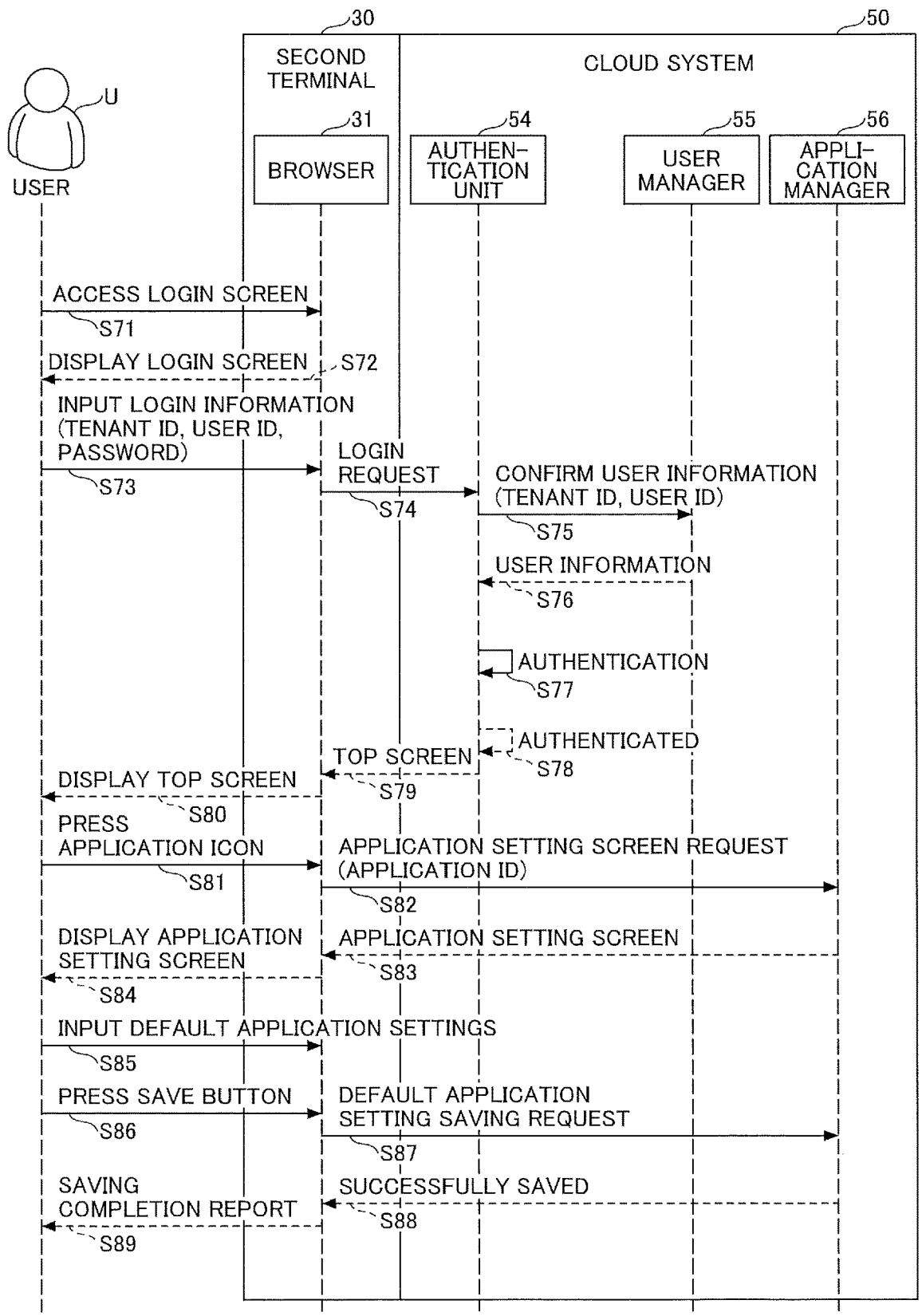
FIG. 23 is a sequence chart illustrating an example of a process where a user makes default settings of an application.

The user U can operate the second terminal 30 to specify default settings of applications to be used from the electronic apparatus 10. FIG. 23 is a sequence chart illustrating an example of a process where the user U specifies default settings of an application. This sequence chart illustrates a process where the user U logs out once after the registration of the account, logs into the cloud system 50 again from the second terminal 30, and specifies settings of an application.@@@ FIG. 23 differs from FIG. 18 in that the user U operates the second terminal 30. Except for this difference, steps S71 through S78 up to the display of the top screen may be substantially the same as steps S51 through S58 of FIG. 18. However, in FIG. 23, the step of starting the launcher screen is not necessary.

Figure 24:
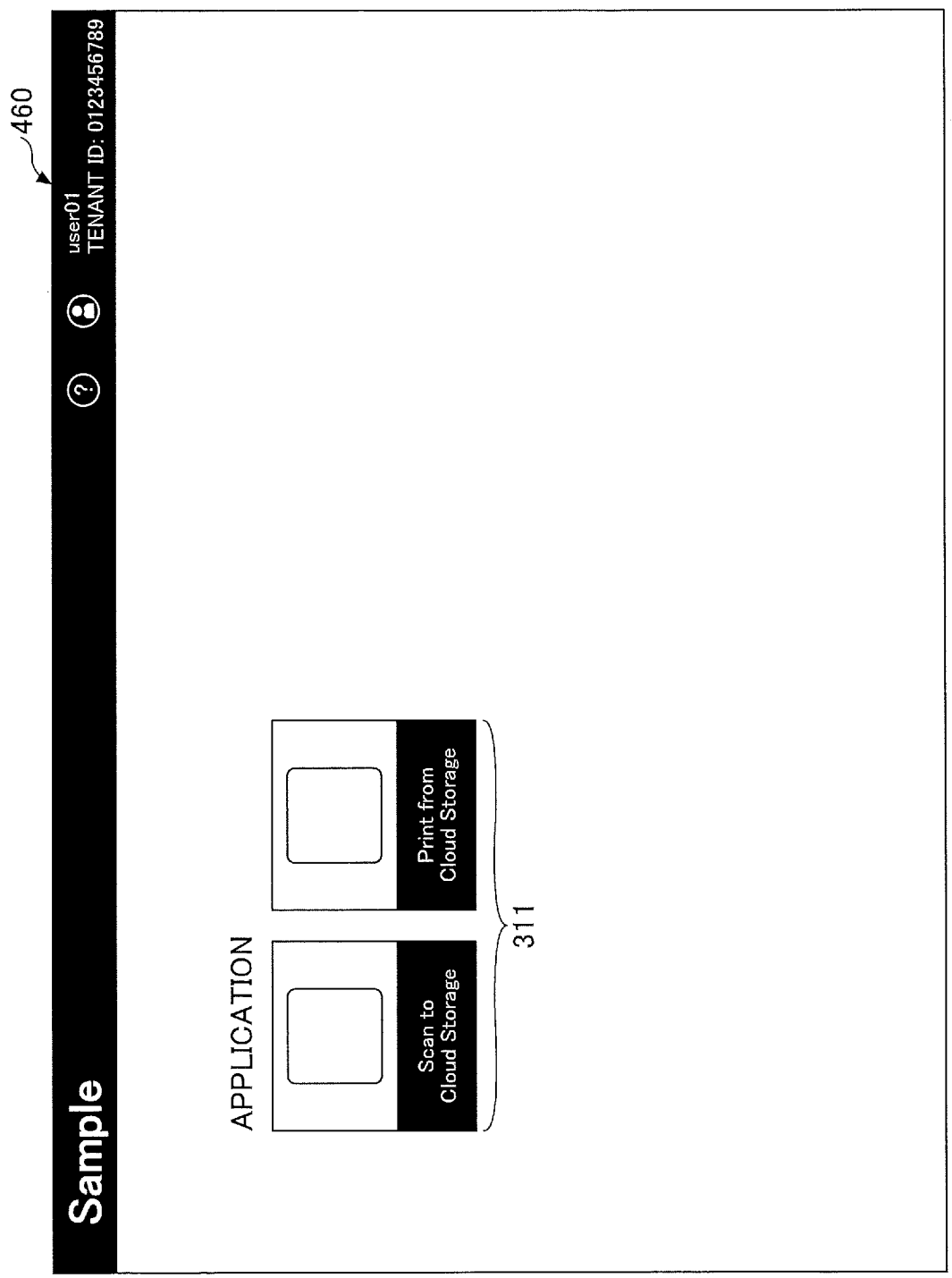
FIG. 24 is a drawing illustrating an example of a top screen displayed by the second terminal.

S79: When the authentication is successful, the authentication unit 54 of the cloud system 50 generates screen information of the top screen. The top screen of the second terminal 30 corresponds to the launcher screen of the image forming apparatus 10a. Therefore, the method of generating screen information may be the same as that in step S59 of FIG. 18. The fourth communication unit 52 of the cloud system 50 sends the screen information of the top screen to the second terminal 30. The configuration of the top screen is not much different from the configuration of the launcher screen. FIG. 24 illustrates the top screen displayed by the second terminal 30.

S80: The user U selects an application on the top screen and performs an operation to display an application setting screen. The operation receiver 34 of the second terminal 30 receives the selection.

S81: The second communication unit 32 of the second terminal 30 sends a request for the application setting screen to the cloud system 50 together with the application ID of the application selected by the user U.

S82: The fourth communication unit 52 of the cloud system 50 receives the request for the application setting screen.

S83: The application manager 56 generates screen information of the application setting screen for the application identified by the application ID. The user can log into the application setting screen. The fourth communication unit 52 sends the screen information of the application setting screen to the second terminal 30.

Figure 25:
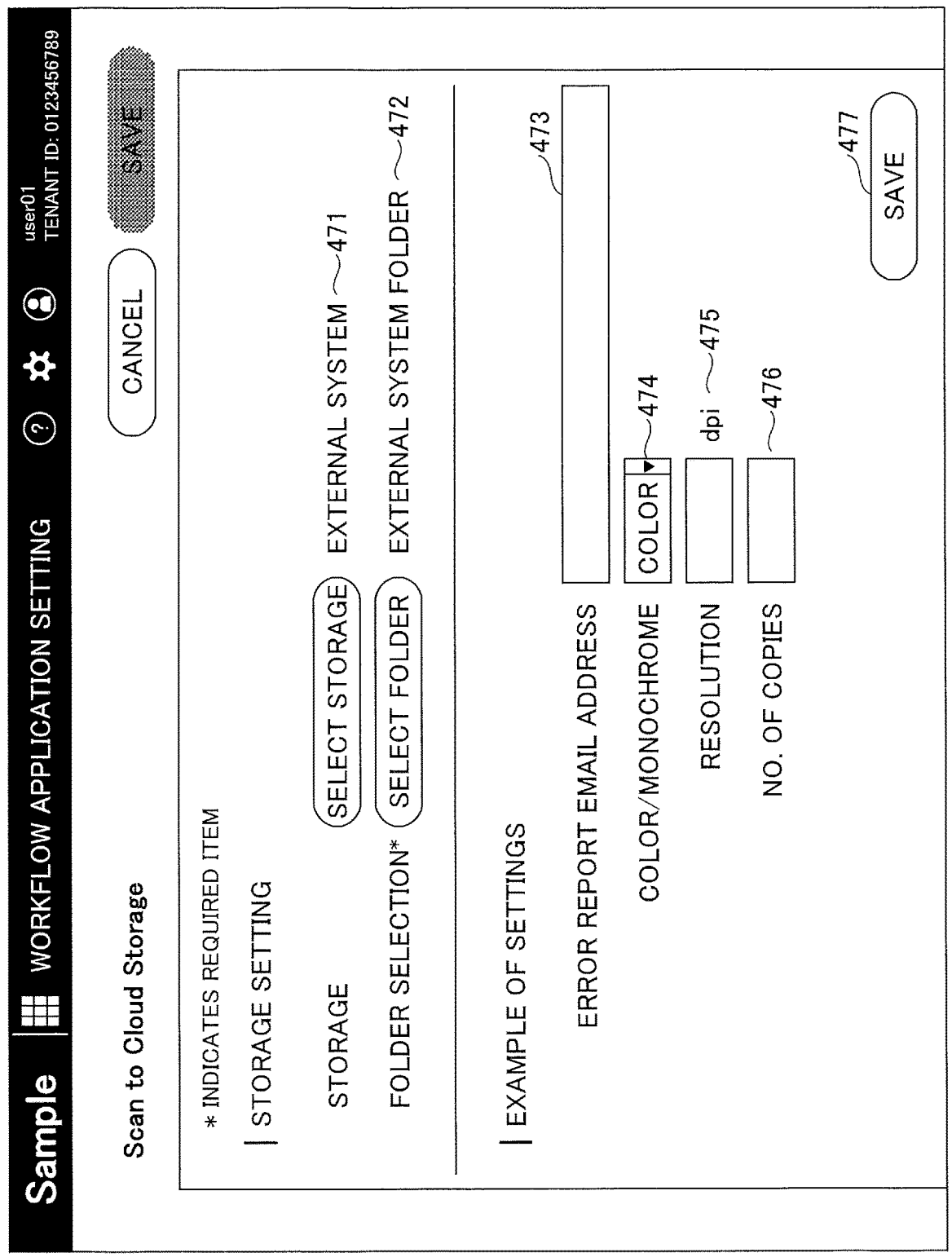
FIG. 25 is a drawing illustrating an example of an application setting screen displayed by the second terminal.

S84: The second communication unit 32 of the second terminal 30 receives the screen information of the application setting screen, and the display controller 33 displays the application setting screen on the display 506 based on the screen information of the application setting screen. FIG. 25 illustrates an example of the application setting screen (an example of a user web page).

S85: The user U inputs default settings of the application on the application setting screen. The operation receiver 34 of the second terminal 30 receives the default setting. The default settings are applied to the application without the involvement of the user U when the application is started.

S86: The user U presses a save button on the application setting screen. The operation receiver 34 of the second terminal 30 receives the pressing of the save button.

S87: The second communication unit 32 of the second terminal 30 sends a setting saving request to the cloud system 50 together with the default settings that are set by the user U and applied when the application is used from the electronic apparatus 10, and the application ID of the application that is registered in the tenant as usable by the user U.

S88: The fourth communication unit 52 of the cloud system 50 receives the default settings of the application. The application manager 56 stores the default settings of the application in the storage 59 for each user in association with the application ID and the user ID. When the user U inputs authentication information on the electronic apparatus 10 and the authentication succeeds based on the user information registered by the user U in the cloud system 50 and when the user U starts the application at the electronic apparatus 10, the application manager 56 sends the default settings associated with the user ID to the electronic apparatus 10. The electronic apparatus 10 applies the received default settings to the application when performing a process using the application on the electronic apparatus 10. Thus, the application can be started with the default settings set by the user U. The application manager 56 sends a saving completion message indicating that the default settings have been successfully saved to the second terminal 30 via the fourth communication unit 52.

S89: The second communication unit 32 of the second terminal 30 receives the saving completion message, and the display controller 33 displays the saving completion message.

Here, as described above with reference to FIG. 13, when the user U accesses the user registration URL and completes the registration of user information, the user automatically logs into the cloud system 50, and the top screen is displayed. Therefore, the user U can go on to set the default settings of the application.

<<Screen Examples>>

FIG. 24 is a drawing illustrating an example of a top screen 460 displayed by the second terminal 30. The top screen 460 has a configuration similar to the configuration of the top screen 310 for the administrator C illustrated in FIG. 8 except that the setting button 312 is not displayed. This is because the user U is unlikely to make settings for the administrator C. Still, however, the setting button 312 may be displayed on the top screen 460 for the user U. The top screen 460, for example, enables specifying settings of applications whose use rights are given to the logged-in user U. Also, depending on the type of application, a process (e.g., image forming) using the electronic apparatus 10 may be executed on the top screen.

FIG. 25 is a drawing illustrating an example of an application setting screen 470 displayed by the second terminal 30. The application setting screen 470 is for a workflow application that scans a document and sends the scanned document to a cloud storage.

As illustrated in FIG. 25, the application setting screen 470 includes a storage setting field 471 for selecting a destination storage, a folder selection field 472 for selecting a destination folder, an error report email address field 473 for setting an email address to which an error is reported, a color/monochrome setting field 474, a resolution field 475, a number of copies field 476, and a save button 477. The settings illustrated in FIG. 25 are default settings, and these settings are applied to the application when the user U starts the application for which the default settings have been made.

FIG. 25 illustrates an example of scanning settings corresponding to the type of the application. However, the user U may also set parameters for printing. Parameters for printing may include, for example, a print color setting, a print paper size setting, a density setting, a duplex setting, and an N-up setting.

In the case of an application that uses an electronic apparatus 10, such as the electronic blackboard 10*b*, other than the image forming apparatus 10*a*, the application setting screen 470 may include parameters unique to the electronic apparatus 10.

SUMMARY

As described above, in the information processing system 1 of the present embodiment, the cloud system 50 generates a user registration URL for user registration for each tenant, and the user U performs new user registration using the user registration URL. This configuration enables the cloud system 50 to register a user U in association with a tenant even when the user U does not have an account in the cloud system 50.

Also, the above configuration makes it possible to register even a new user who is neither the user of the cloud system 50 nor the user of an apparatus in association with a tenant. Further, the above configuration enables an administrator to easily add users to a tenant and manage applications for the users and enables the users to make various settings and execute applications via apparatuses by using web pages (web applications) provided separately for the administrator and the users.

OTHER APPLICATIONS

A cloud system, an information processing system, and a user registration method according to embodiments of the present invention are described above. However, the present invention is not limited to the specifically disclosed embodiments, and variations and modifications may be made without departing from the scope of the present invention.

For example, although a method of registering users in a tenant is described in the above embodiment, the present invention may be applied to a method of registering users in any kind of group.

Also, although a registration method of new users is described in the above embodiment, the present invention may also be applied to a method of registering existing users. Here, existing users indicate users who already have accounts in the cloud system 50.

The configurations of the first terminal 20, the second terminal 30, the electronic apparatus 10, and the cloud system 50 illustrated in FIG. 5 are examples provided to facilitate the understanding of the present invention. The present invention is not limited by the manner in which the first terminal 20, the second terminal 30, the electronic apparatus 10, and the cloud system 50 are divided into functional components and by the names of those functional components. The functional components of the first terminal 20, the second terminal 30, the electronic apparatus 10, and the cloud system 50 may be further divided into smaller components or may be combined into larger components depending on the types of processes to be performed.

The apparatuses described in the above embodiment merely represent one of multiple computing environments for implementing the embodiment disclosed in the present application. In one embodiment, the cloud system 50 may include multiple computing devices like a server cluster. The multiple computing devices may be configured to communicate with each other via a communication link such as a network or a shared memory and perform processes disclosed in the present application.

Further, the cloud system 50 may be configured to share various combinations of steps illustrated in, for example, FIG. 6, FIG. 13, FIG. 18, and FIG. 23. For example, a process executed by a certain unit may be executed by multiple information processing apparatuses included in the cloud system 50. The cloud system 50 may be implemented by one server or may be distributed to multiple apparatuses.

Each of the functional components described in the above embodiment may be implemented by one or more processing circuits. In the present application, the term "processing circuit" may indicate a processor implemented by an electronic circuit and programmed by software to implement various functions or a device such as an application specific integrated circuit (ASIC), a digital signal processor (DSP), a field programmable gate array (FPGA), or a circuit module designed to implement various functions described above.

An aspect of this disclosure makes it possible to flexibly add new users to a tenant, to flexibly manage users, and to flexibly make various settings.

What is claimed is:

1. A cloud system that provides services to a user registered in a tenant, the cloud system comprising:
a hardware processor; and
a memory storing program instructions that cause the hardware processor to:
receive a communication destination information generation request that includes user registration parameters input from a first terminal device by an administrator logged in at the first terminal device, the user registration parameters including at least
a communication destination validity period that indicates a period of time for which a communication destination for registering the user in association with the tenant is accessible to register the user, and
usage-right setting information indicating services provided by the cloud system that the user is authorized to use;
issue communication destination information of the communication destination in response to the communication destination information generation request, the communication destination information including
tenant identification information that identifies the tenant, the tenant identified by the tenant identification information being automatically set to the same tenant associated with the administrator logged in at the first terminal device, and
communication destination identification (ID) information indicating the communication destination including the parameters;
receive a user information registration request from a second terminal device to register user information input by the user from the second terminal device;
identify the communication destination in response to receiving the user information registration request based on the communication destination ID) information included in the communication destination information;
receive the user information input from the second terminal device to the identified communication destination;
associates the user information received from the second terminal device with the tenant identified by the tenant identification information based on the communication destination indicated by the communication destination ID information, and registers the user information in association with the identified tenant; and
grant the user associated with the registered user information access to the services provided by the cloud system based on the service usage-right setting information set for the tenant in which the user is registered.

2. The cloud system as claimed in claim 1, wherein the program instructions further cause the processor to:
issue the communication destination for each tenant and to register the user connected to the communication destination in the tenant for which the communication destination is issued.

3. The cloud system as claimed in claim 2, wherein the program instructions further cause the processor to:
store a list of applications related to the services in association with destination identification information identifying the communication destination,
send, to the first terminal, the communication destination associated with the destination identification information and the tenant identification information, and
in a case where the second terminal is connected to the communication destination associated with the destination identification information and the tenant identification information, register usable application information for the user, as indicated by the service usage-right setting information based on the tenant.

4. The cloud system as claimed in claim 3, wherein in a case where a registration limit of an application is exceeded, the processor registers the usable application information indicating the usable applications, excluding the application whose registration limit is exceeded, in association with the user registered in the tenant.

5. The cloud system as claimed in claim 3, wherein the program instructions further cause the processor to:
store the communication destination validity period for which the communication destination in association with the destination identification information is accessible to register the user,
send, to the first terminal, the communication destination associated with the destination identification information and the tenant identification information; and
in a case where the second terminal is connected to the communication destination associated with the destination identification information and the tenant identification information, register the user in association with the tenant unless the communication destination validity period has expired.

6. The cloud system as claimed in claim 5, wherein in a case where the second terminal is connected to the communication destination associated with the destination identification information and the tenant identification information and the communication destination validity period has expired, the processor reports an error to the second terminal.

7. The cloud system as claimed in claim 5, wherein in a case where a registration limit set for each application is exceeded, the processor reports, to the second terminal, an error indicating the application whose registration limit is exceeded.

8. The cloud system as claimed in claim 3, wherein the program instructions further cause the processor to:
receive application identification information of an application for which information indicating that the application is usable by the user is registered in the tenant and a default setting applied to the application when the application is used from an electronic apparatus,
store the default setting for the user in association with the application identification information, and
when the application identified by the application identification information is executed by the electronic apparatus, send the stored default setting to the electronic apparatus; and
the electronic apparatus applies the default setting received from the cloud system to the application when executing the application.

9. The cloud system as claimed in claim 1, wherein the program instructions further cause the processor to:
issue the communication destination for each role in the tenant, and
register the user connected to the communication destination in the tenant as a user having the role identified based on the communication destination.

10. The cloud system as claimed in claim 2, wherein the program instructions further cause the processor to:
store a number of users in association with destination identification information identifying the communication destination,
send, to the first terminal, the communication destination associated with the destination identification information and the tenant identification information, and
in a case where the second terminal is connected to the communication destination associated with the destination identification information and the tenant identification information, register the user in association with the tenant unless the number of users identified by the destination identification information is exceeded.

11. The cloud system as claimed in claim 10, wherein in a case where the second terminal is connected to the communication destination associated with the destination identification information and the tenant identification information and the number of users identified by the destination identification information is exceeded, the processor reports an error to the second terminal.

12. The cloud system as claimed in claim 2, wherein the cloud system is configured to cause the first terminal to display a use right management screen for editing a list of users registered in the tenant and use rights of applications assigned to the users.

13. The cloud system as claimed in claim 2, wherein when authentication information registered by the user is transmitted from the second terminal or an electronic apparatus, the cloud system allows the user registered in the tenant to log into the cloud system.

14. The cloud system as claimed in claim 1, wherein the program instructions further cause the processor to:
send, to a first terminal, an administrator web page to which an administrator of the tenant is allowed to log in,
issue an URL that is the communication destination via the administrator web page, send screen information of a user registration screen to a second terminal accessing the URL,
generate a user web page to which the user registered in the tenant is allowed to log in based on user information registered via the user registration screen,
receive an application setting related to a service usable by the user via the user web page, and
allow an electronic apparatus to execute an application based on the application setting when authentication based on the registered user information is successful at the electronic apparatus.

15. An information processing system, comprising:
a first terminal of an administrator
a second terminal of a user registered in a tenant; and
a cloud system that provides services to the terminal, the cloud system including
a hardware processor; and
a memory storing program instructions that cause the hardware processor to:
   receive a communication destination information generation request that includes user registration parameters from a first terminal device by an administrator logged in at the first terminal device, the user registration parameters including at least,
   a communication destination validity period that indicates a period of time for which a communication destination for registering the user in association with the tenant is accessible to register the user, and
   usage-right setting information indicating services provided by the cloud system that the user is authorized to use;
   issue communication destination information of the communication destination in response to the communication destination information generation request, the communication destination information including
      tenant identification information that identifies the tenant, the tenant identified by the tenant identification information being automatically set to the same tenant associated with the administrator logged in at the first terminal device, and
      communication destination identification (ID) information indicating the communication destination including the parameters,
   receive a user information registration request from the second terminal device to register user information input by the user from the second terminal device,
   identify the communication destination in response to receiving the user information registration request based on the communication destination ID information included in the communication destination information,
   receive the user information input from the second terminal device to the identified communication destination;
   associates the user information received from the second terminal device with the tenant identified by the tenant identification information based on the communication destination indicated by the communication destination ID information, and registers the user information in association with the identified tenant, and
   grant the user associated with the registered user information access to the services provided by the cloud system based on the service usage-right setting information set for the tenant in which the user is registered.

16. A method performed by a cloud system to register a user in a tenant, the method comprising:
   receiving a communication destination information generation request that includes user registration parameters input from a first terminal device by an administrator logged in at the first terminal device, the user registration parameters including at least;
   a communication destination validity period that indicates a period of time for which a communication destination for registering the user in association with the tenant is accessible to register the user, and
   usage-right setting information indicating services provided by the cloud system that the user is authorized to use;
   issuing communication destination information of the communication destination in response to the communication destination information generation request, the communication destination information including
      tenant identification information that identifies the tenant, the tenant identified by the tenant identification information being automatically set to the same tenant associated with the administrator logged in at the first terminal device, and
      communication destination identification (ID) information indicating the communication destination including the parameters;
   receiving a user information registration request from a second terminal device to register user information input by the user from the second terminal device;
   identifying the communication destination in response to receiving the user information registration request based on the communication destination ID information included in the communication destination information;
   receive the user information input from the second terminal device to the identified communication destination;
   associating the user information received from the second terminal device with the tenant identified by the tenant identification information based on the communication destination indicated by the communication destination ID information, and registering the user information in association with the identified tenant;
   granting the user associated with the registered user information access to the services provided by the cloud system based on the service usage-right setting information set for the tenant in which the user is registered.

* * * * *